United States Patent
Jeong et al.

(10) Patent No.: US 10,243,179 B2
(45) Date of Patent: Mar. 26, 2019

(54) SECONDARY BATTERY AND METHOD OF MANUFACTURING THE SAME

(71) Applicant: Samsung Electronics Co., Ltd., Suwon-si, Gyeonggi-do (KR)

(72) Inventors: Huisu Jeong, Suwon-si (KR); Kyunghoon Cho, Suwon-si (KR); Hojung Yang, Suwon-si (KR); Hwiyeol Park, Suwon-si (KR); Jin S. Heo, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 184 days.

(21) Appl. No.: 15/270,191

(22) Filed: Sep. 20, 2016

(65) Prior Publication Data
US 2017/0149034 A1    May 25, 2017

(30) Foreign Application Priority Data

Nov. 25, 2015    (KR) .................. 10-2015-0165576

(51) Int. Cl.
| | | |
|---|---|---|
| *H01M 2/10* | (2006.01) | |
| *H01M 10/05* | (2010.01) | |
| *H01M 4/13* | (2010.01) | |
| *H01M 10/0585* | (2010.01) | |
| *H01M 4/139* | (2010.01) | |
| *H01M 10/04* | (2006.01) | |
| *H01M 10/052* | (2010.01) | |

(Continued)

(52) U.S. Cl.
CPC ........... *H01M 2/1061* (2013.01); *H01M 4/13* (2013.01); *H01M 4/139* (2013.01);
(Continued)

(58) Field of Classification Search
None
See application file for complete search history.

(56) References Cited

U.S. PATENT DOCUMENTS 8,865,345 B1 * 10/2014 Ramasubramanian ..................... C25D 13/12
429/163
8,900,743 B2    12/2014 Kim et al.
(Continued)

FOREIGN PATENT DOCUMENTS

| EP | 3043409 A1 | 3/2016 |
|---|---|---|
| JP | 2007012421 A | 1/2007 |

(Continued)

OTHER PUBLICATIONS

Song et al., "Cycling-Driven Strutural Changes in a Thin-Film Lithium Battery on Flexible Substrate", Electrochemical and Solid-State Letters, 12(8), 2009-, A159-A162.
(Continued)

*Primary Examiner* — Scott J. Chmielecki
(74) *Attorney, Agent, or Firm* — Cantor Colburn LLP

(57) ABSTRACT

A secondary battery including: a plurality of unit cells, wherein each unit cell of the plurality of unit cells includes a cathode extending in a top to bottom direction, an electrolyte membrane surrounding at least three surfaces of the cathode, and an anode surrounding at least a portion of the electrolyte membrane, wherein unit cells of the plurality of unit cells are spaced apart from each other in a left to right direction, with cavities therebetween, and a support member configured to support the plurality of unit cells in the left to right direction and disposed between unit cells of the plurality of unit cells.

27 Claims, 24 Drawing Sheets

(51) Int. Cl.
  *H01M 10/0562* (2010.01)
  *H01M 10/058* (2010.01)
  *H01M 4/04* (2006.01)
  *H01M 4/02* (2006.01)

(52) U.S. Cl.
  CPC ..... *H01M 10/0436* (2013.01); *H01M 10/052* (2013.01); *H01M 10/058* (2013.01); *H01M 10/0562* (2013.01); *H01M 10/0585* (2013.01); *H01M 4/0492* (2013.01); *H01M 2004/025* (2013.01)

(56) References Cited

U.S. PATENT DOCUMENTS

| | | | |
|---|---|---|---|
| 2002/0155338 A1* | 10/2002 | Croset | H01M 8/0232 429/456 |
| 2008/0081256 A1 | 4/2008 | Madou et al. | |
| 2011/0027650 A1 | 2/2011 | Yamamoto et al. | |
| 2011/0045349 A1* | 2/2011 | Pushparaj | H01G 9/0029 429/212 |
| 2013/0078513 A1* | 3/2013 | Nathan | H01G 11/06 429/211 |
| 2015/0263382 A1* | 9/2015 | Singh | H01M 10/0565 429/313 |

FOREIGN PATENT DOCUMENTS

| | | |
|---|---|---|
| JP | 5231557 B2 | 3/2013 |
| WO | 2008030215 A2 | 3/2008 |
| WO | 2017010887 A1 | 1/2017 |

OTHER PUBLICATIONS

European Search Report for European Patent Application No. 16199993.3 dated Apr. 19, 2017.

* cited by examiner under 35 U.S.C. § 119,

SECONDARY BATTERY AND METHOD OF MANUFACTURING THE SAME

CROSS-REFERENCE TO RELATED APPLICATION

This application claims priority to and the benefit of Korean Patent Application No. 10-2015-0165576, filed on Nov. 25, 2015 in the Korean Intellectual Property Office, and all the benefits accruing therefrom under 35 U.S.C. § 119, the content of which is incorporated herein in its entirety by reference.

BACKGROUND

1. Field

The present disclosure relates to secondary batteries with improved capacity and lifespan, and methods of manufacturing the same.

2. Description of the Related Art

Unlike primary batteries, secondary batteries are rechargeable. Secondary batteries have been widely used for state-of-the-art electronic devices such as cellular phones, smartphones, laptop computers, camcorders, wearable devices, and so forth.

In particular, the demand for lithium batteries has increased because they have a higher voltage and higher energy density per unit weight than nickel-cadmium batteries or nickel-hydrogen batteries. A lithium-based oxide is mainly used as a cathode active material of a lithium battery, and a carbon material is mainly used as an anode active material of the lithium battery. Lithium batteries are generally classified into liquid electrolyte batteries and polymer electrolyte batteries according to a type of electrolyte used in the battery. A liquid electrolyte battery is also referred to as a lithium ion battery and a polymer electrolyte battery is also referred to as a lithium polymer battery.

Despite recent advances, there remains a need for improved lithium secondary batteries.

SUMMARY

Provided are a secondary battery and a method of manufacturing the same. When a volume of an inner structure of the secondary battery is changed during charging and discharging, a corresponding inner stress may be attenuated or absorbed.

According to an aspect of an embodiment, disclosed is a secondary battery including: a plurality of unit cells, wherein each unit cell of the plurality of unit cells includes a cathode extending in a top to bottom direction, an electrolyte membrane surrounding at least three surfaces of the cathode, and an anode surrounding at least a portion of the electrolyte membrane, wherein unit cells in the plurality of unit cells are spaced apart from each other in a left to right direction, with cavities therebetween, and a support member configured to support the plurality of unit cells in the left to right direction is disposed between unit cells of the plurality of unit cells.

A width of each of the cavities in the left to right direction may be from about one time to about five times as large as a width of the cathode in the left-right direction.

A width of each of the cavities in the left to right direction may be from about one time to about five times greater than a thickness of the anode.

A height of the support member may be from about 5% to about 15% of a height of the cathode.

A height of the support member may be greater than a thickness of the electrolyte membrane.

The support member may be elastically deformable.

The support member may have a Young's modulus from about 0.1 gigapascal (GPa) to about 10 GPa.

The support member may have ion conductivity.

The support member may be arranged between electrolyte membranes of adjacent unit cells.

The support member may be disposed below the anode.

A volume of the anode during charging of the secondary battery may be from about 150% to about 400% of a volume of the anode during discharging of the secondary battery.

A volume of the cathode during charging of the secondary battery may be from about 110% to about 130% of a volume of the cathode during discharging of the secondary battery.

The secondary battery may further include a cathode current collector in electrical contact with an end portion of a cathode of each unit cell of the plurality of unit cells.

The secondary battery may further include an inner current collector disposed in a cathode of each unit cell of the plurality of unit cells, and electrically connected to the cathode current collector.

The secondary battery may further include an anode current collector in electrical contact with the anode.

The anode current collector may be in electrical contact with a surface of the anode facing the cavity.

A cathode of each unit cell of the plurality of unit cells may further extend in a front to rear direction.

According to an aspect of another embodiment, a method of manufacturing a secondary battery includes: removing a plurality of sacrificial layers from a stacked structure, the stacked structure including a plurality of cathodes and the plurality of sacrificial layers alternately stacked in a left to right direction to space each cathode of the plurality of cathodes apart from each other in the left to right direction, forming an electrolyte membrane on surfaces of each cathode of the plurality of cathodes spaced apart from each other, forming a support member supporting the electrolyte membrane in the left to right direction, the support member being formed between the electrolyte membranes formed on surfaces of the plurality of cathodes spaced apart from each other, and forming an anode on surfaces of the electrolyte membranes, wherein the forming of the anode includes forming the anode such that a cavity is formed between the anodes formed on facing surfaces of the electrolyte membranes.

The forming of the anodes may include forming the anodes such that a width of each of the cavities in the left to right direction is from about one time to about five times greater than a width of each of the cathodes in the left-right direction.

The forming of the anodes may include forming the anodes such that a width of each of the cavities in the left-right direction is from about one time to about five times greater than a thickness of the anode.

The forming of the support member may include forming the support member such that a height of the support member is from about 5% to about 15% of a height of each of the cathode.

The support member may be elastically deformable.

The support member may have a Young's modulus from about 0.1 GPa to about 10 GPa.

The support member may have ion conductivity.

The method may further include forming a cathode current collector in electrical contact with the plurality of cathodes and forming an anode current collector in electrical contact with the anode.

The forming of the anode current collector may include forming the anode current collector on a surface of each of the cathodes.

The forming of the support member may include inserting a portion of the electrolyte membrane into a pre-support member and removing a portion of the pre-support member and a portion of the electrolyte membrane to expose the cathode to an outside of the secondary battery.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
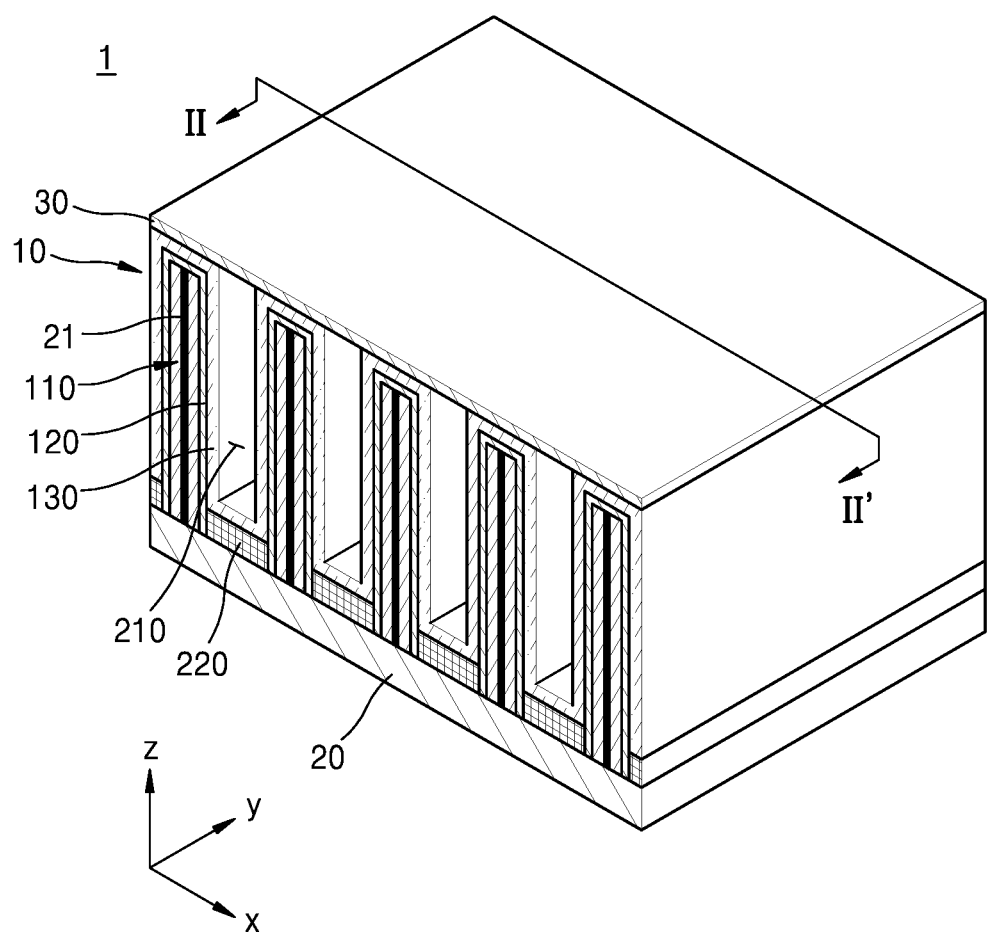
FIG. 1 is a perspective view schematically showing a secondary battery according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. Expressions such as "at least one of," when preceding a list of elements, modify the entire list of elements and do not modify the individual elements of the list.

Hereinafter, a secondary battery and a method of manufacturing the same according to embodiments will be described in detail with reference to the accompanying drawings. Throughout the drawings, like reference numerals refer to like elements, and a size or a thickness of each element may be exaggerated for convenience of description. Meanwhile, the following embodiments are merely examples, and various changes may be made from the embodiments. Hereinbelow, when it is described that a layer is provided "above", "in an upper portion", or "on" a substrate or another layer, the layer may exist on the substrate or another layer while directly contacting the substrate or another layer, or still another layer may exist between the substrate or another layer. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
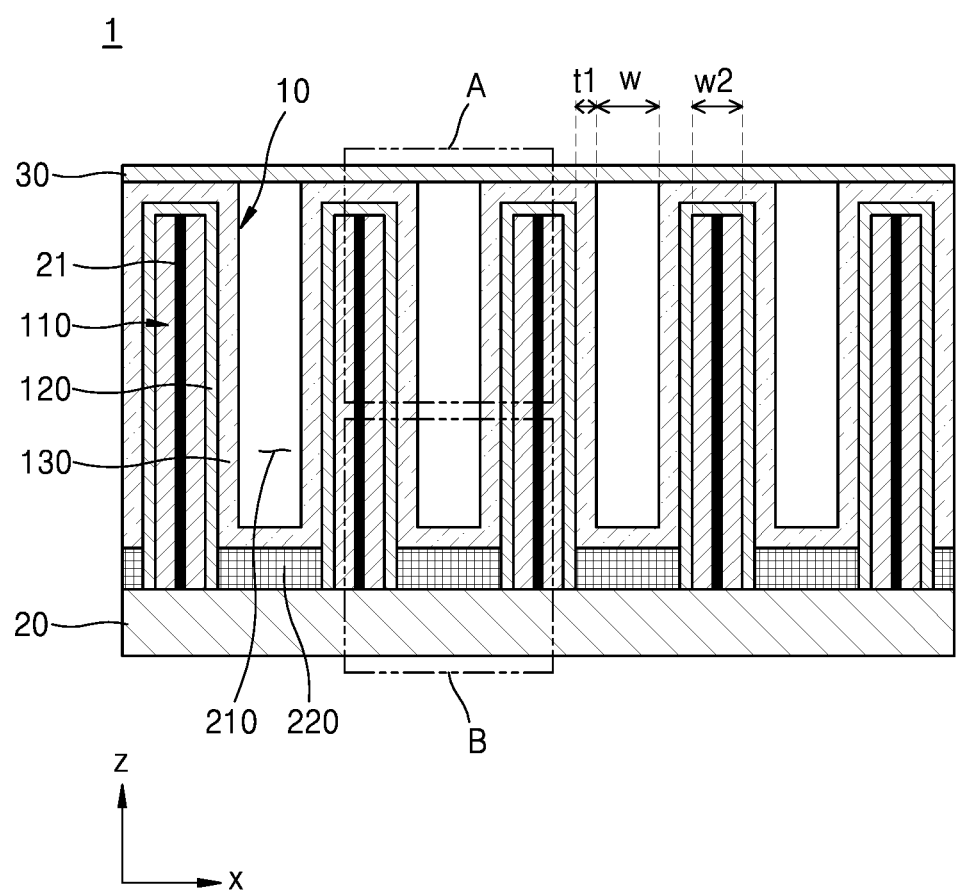
FIG. 2 is a cross-sectional view taken along line II-II' in the secondary battery of FIG. 1.

FIG. 1 is a perspective view schematically illustrating a secondary battery 1 according to an embodiment. FIG. 2 is a cross-sectional view along line II-II' in the secondary battery 1 of FIG. 1.

Referring to FIGS. 1 and 2, the secondary battery 1 according to an embodiment may include a cathode current collector 20, a plurality of unit cells 10 on the cathode current collector 20, and a support member 220 supporting the plurality of unit cells 10 in a left to right direction (e.g. along an "x" direction). An anode current collector 30 may be disposed on at least some of the unit cells of the plurality of unit cells 10.

Each of the plurality of unit cells 10 may include a cathode 110, an anode 130, and an electrolyte membrane 120 between the cathode 110 and the anode 130.

The cathode 110 extends in a first direction, e.g., a top to bottom direction (a "z" direction). A top to bottom direction height (which will hereinafter be referred to as a 'height') of the cathode 110 may be about several hundreds of micrometers (μm). For example, the height of the cathode 110 may be about 100 μm to about 999 μm. The height of the cathode 110 may be, for example, about 100 μm-about 500 μm.

The cathode 110 further extends in a second direction that is perpendicular to the first direction, e.g., in a front to rear direction (a "y" direction).

The cathode 110 may include a mixture of a cathode active material, a conductive material, and a binder. Alternatively, the cathode 110 may include a cathode active material alone, without a conductive material or a binder. For example, the cathode 110 may include cathode active material which is a sintered polycrystalline ceramic having a cathode composition such as $LiCoO_2$.

The anode 130 may include an anode active material, a conductive material, and a binder. Alternatively, the anode 130 may include an anode active material alone, without a conductive material or a binder. For example, the anode 130 may include an anode metal such as a lithium (Li) metal.

The electrolyte membrane 120 is disposed to prevent the cathode 110 and the anode 130 from directly contacting one another. For example, the electrolyte membrane 120 may be disposed between the cathode 110 and the anode 130. Thus, the cathode 110 and the anode 130 are capable of exchanging metal ions through the electrolyte membrane 120 without directly contacting each other.

The electrolyte membrane 120 is shaped by the shape of the cathode 110. For example, the electrolyte membrane 120 may surround at least three surfaces of the cathode 110. The anode 130 surrounds at least a portion of the electrolyte membrane 120. The electrolyte membrane 120 has a uniform thickness. The thickness of the electrolyte membrane 120 may be equal to or less than about 2 μm.

According to an embodiment, the electrolyte membrane 120 may include a solid electrolyte. For example, the electrolyte membrane 120 may include solid electrolytes such as $Li_3PO_4$, $Li_3PO_4$-xNx, $LiBO_2$-xNx, $Li_3PO_4Nx$, $LiBO_2Nx$, $Li_4SiO_4$—$Li_3PO_4$, $Li_4SiO_4$—$Li_3VO_4$, or the like, or a combination thereof. The electrolyte membrane 120 may have a serpentine form.

The unit cells of the plurality of unit cells 10 are disposed to be spaced apart from each other in a third direction, e.g., the left to right direction (the x direction), and to have cavities 210 therebetween. The third direction may intersect, e.g., is perpendicular to, the first direction and the second direction.

In each unit cell of the plurality of unit cells 10, the anode 130 is disposed outside of the cathode 110 and the anode 130 is disposed to face the cavity 210.

Figure 3:
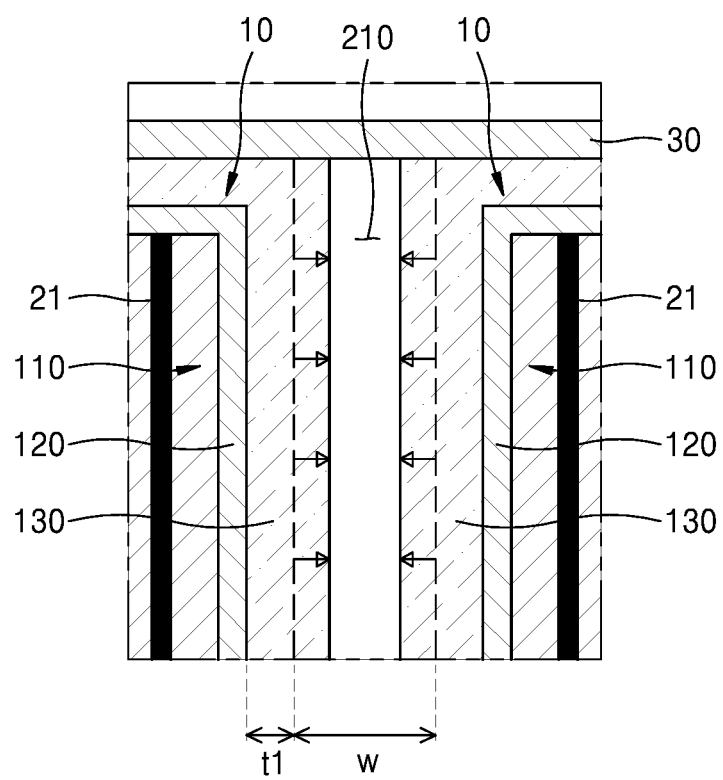
FIG. 3 is a cross-sectional view illustrating a role of a cavity in a secondary battery according to an embodiment.

FIG. 3 is a view describing a role of the cavity 210 in the secondary battery 1 according to an embodiment. Referring to FIG. 3, during charging/discharging of the secondary battery 1, the volume of the unit cell 10 may vary. In the course of charging/discharging of the secondary battery 1, the volume of the anode 130 may change. The volume of the anode 130 during charging of the secondary battery 1 may be greater than the volume of the anode 130 during discharging of the secondary battery 1. For example, the volume of the anode 130 during charging of the secondary battery 1 may be from about 150% to about 400% of the volume of the anode 130 during discharging of the secondary battery 1.

In the secondary battery 1 according to an embodiment, the cavity 210 is disposed to face the anode 130, in order to provide a space to accommodate the change in the volume of the anode 130. In other words, during charging of the secondary battery 1, even if the anode 130 expands, it is possible to prevent the anodes 130 of adjacent unit cells 10 from contacting each other.

Referring to FIGS. 2 and 3, for example, a left to right direction width w of the cavity 210 may be greater than or equal to a thickness t1 of the anode 130. However, the left-right direction width w of the cavity 210 may be up to about five times greater than the thickness t1 of the anode 130, considering the energy density of the secondary battery 1. In another example, the left to right direction width w of the cavity 210 may be from about one time to about five times greater than the left to right direction width w2 of the cathode 110. Herein, the thickness t1 of the anode 130 is defined as a thickness in a direction extending away from the surface of the electrolyte membrane 120 when the secondary battery 1 is in a discharged state. The left-right direction width w2 of the cathode 110 is defined as a left to right direction width of the cathode 110 when the secondary battery 1 is in a discharged state. The left-right direction width w of the cavity 210 is defined as the left-right direction width of the cavity 210 when the secondary battery 1 is in a discharged state.

If the cavity 210 is not secured outside the anode 130, the volume of the anode 130 repeatedly shrinks and expands as the secondary battery 1 is repetitively charged and discharged. When the volume of the anode 130 repeatedly shrinks and expands, the anode 130 repeatedly applies pressure to and releases pressure from an element disposed near the anode 130, e.g., the electrolyte membrane 120. As a result, a crack may be generated inside the anode 130, or the anode 130 and the electrolyte membrane 120 may be separated from each other, thereby reducing the capacity or lifespan of the secondary battery 1.

However, in the secondary battery 1 according to an embodiment, the cavity 210 is located outside the anode 130, such that even when the volume of the anode 130 expands, pressurization of an element disposed near the anode 130 by the anode 130 may be reduced. Thus, a crack inside the anode 130 and separation between the anode 130 and the electrolyte membrane 120, which may occur due to the volume expansion of the anode 130, may be prevented.

Referring back to FIGS. 1 and 2, the support member 220 supports the adjacent unit cells 10 having the cavity 210 therebetween, such that the unit cells 10 may not fall or collapse. The support member 220 is disposed between adjacent unit cells of the plurality of unit cells having the cavities 210 in such a way to support the unit cells 10 in the left to right direction. For example, the support member 220 may be disposed below the cavity 210 to contact and support lower areas of the unit cells 10.

The support member 220 extends in the front to rear direction.

The height of the support member 220 is greater than the thickness of the electrolyte membrane 120. For example, the height of the support member 220 may be at least about five times greater than the thickness of the electrolyte membrane 120. For example, when the thickness of the electrolyte membrane 120 is about 2 μm, the height of the support member 220 may be about 10 μm or greater. Herein, the thickness of the electrolyte membrane 120 is defined as a thickness extending in a direction away from the surface of the cathode 110.

Figure 4:
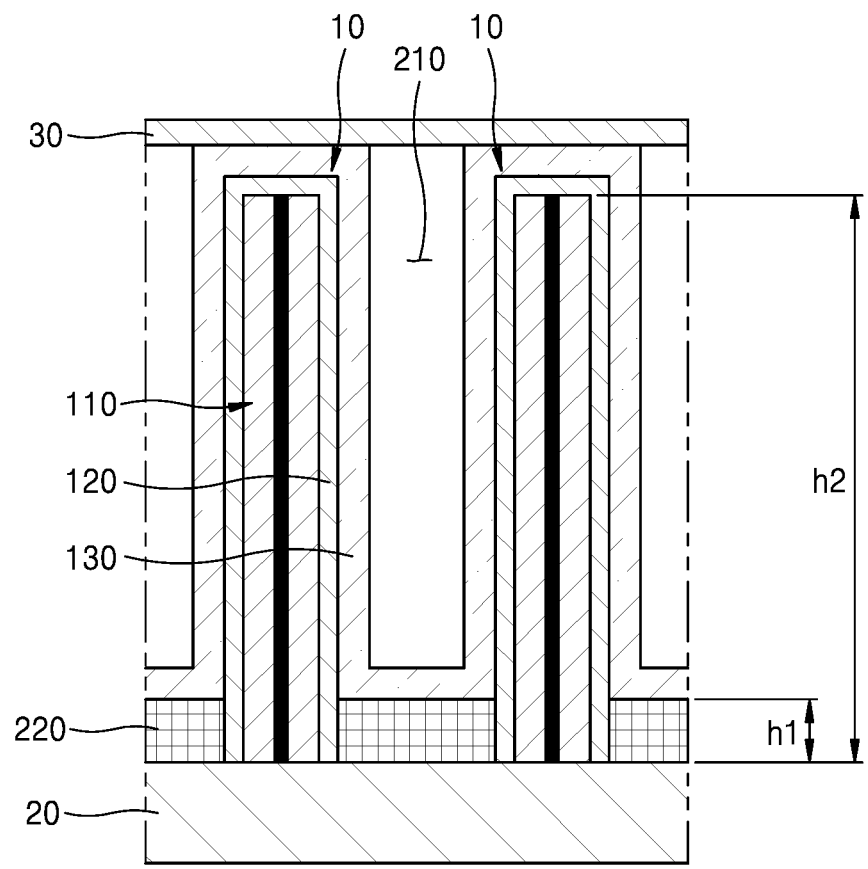
FIG. 4 is an enlarged cross-sectional view of a portion A in the secondary battery shown in FIG. 2.

FIG. 4 is an enlarged cross-sectional view of portion A of the secondary battery 1 according to the embodiment of FIG. 2. Referring to FIG. 4, the support member 220 has a height h1 such that the adjacent unit cells 10 having the cavity 210 therebetween may not collapse.

For example, the height h1 of the support member 220 may be from about 5% to about 15% of a height h2 of the cathode 110. If the height h1 of the support member 220 is less than about 5% of the height h2 of the cathode 110, the unit cells 10 may collapse in spite of the disposition of the support member 220. On the other hand, if the height h1 of the support member 220 exceeds about 15% of the height h2 of the cathode 110, such a height h1 may be useful to prevent the unit cells 10 from collapsing, however a height of the cavity 210 may be reduced as much as the height h1 of the support member 220 increases. As a result, the original intended effect of the cavity 210 may be reduced. Moreover, when the height h1 of the support member 220 exceeds about 15% of the height h2 of the cathode 110, an area of the anode 130 covering the electrolyte membrane 120 is significantly reduced, thereby hindering an operation of a device.

The support member 220 disposed between the unit cells 10 to prevent the unit cells from collapsing may be capable of being elastically deformed. Since the support member 220 may be elastically deformed, the support member 220 may absorb stress generated as the volume of the cathode 110 changes.

The support member 220 may have a Young's modulus between about 0.1 gigapascal (GPa) to about 10 GPa. The support member 220 may include a thermally curable resin or an ultraviolet (UV) light-curable resin. The support member 220 may include, but is not limited to, a polymer epoxy.

Figure 5:
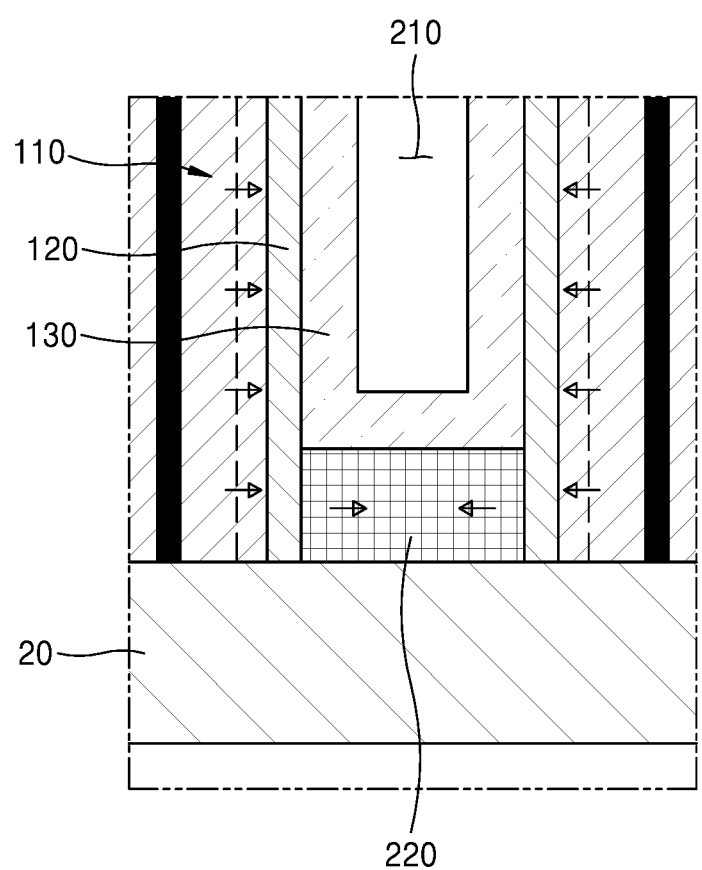
FIG. 5 is an enlarged cross-sectional view of a portion B in the secondary battery shown in FIG. 2, which describes a role of a support member capable of elastic deformation.

FIG. 5 is an enlarged cross-sectional view of portion B of the secondary battery 1 according to the embodiment of FIG. 2, and describes a role of the support member 220 capable of elastic deformation.

Referring to FIG. 5, during charging/discharging of the secondary battery 1, the volume of the unit cell 10 may change. For example, during charging/discharging of the secondary battery 1, the volume of the cathode 110 may change. The volume of the cathode 110 during charging of the secondary battery 1 may be larger than the volume of the cathode 110 during discharging of the secondary battery 1. For example, the volume of the cathode 110 during charging of the secondary battery 1 may be from about 110% to about 130% of the volume of the cathode 110 during discharging of the secondary battery 1.

Since the support member 220 is capable of elastic deformation, if the volume of the cathode 110 changes, the volume of the support member 220 may change to correspond to the change in the volume of the cathode 110. For example, when the volume of the cathode 110 expands during charging of the secondary battery 1, the support member 220 may shrink by being elastically deformed. Thus, internal stress that may be generated by the change of the volume of the cathode 110 may be absorbed by the support member 220.

As such, in the secondary battery 1 according to the embodiment, with the cavities 210 existing between the plurality of unit cells 10, it is possible to prevent stress inside the secondary battery 1 from being generated by the change in the volume of the anode 130 or to absorb the generated stress, and with the support member 220, it is possible to prevent the plurality of unit cells 10 from collapsing, to prevent stress from being generated inside the secondary battery 1 by the change in the volume of the cathode 110, or to absorb the generated stress.

Referring back to FIG. 2, an end portion of the cathode 110 of each of the plurality of unit cells 10 may be electrically connected to the cathode current collector 20. For example, an end portion of the cathode 110 of each of the plurality of unit cells 10 may be in electrical contact with the cathode current collector 20.

The cathode current collector 20 may include a conductive metallic material such as Cu, Au, Pt, Ag, Zn, Al, Mg, Ti, Fe, Co, Ni, Ge, In, Pd, or the like, or a combination thereof.

On the cathode current collector 20, the plurality of cathodes 110 and the plurality of support members 220 may be disposed.

The cathode 110 may be disposed to protrude in a direction substantially perpendicular to the surface of the cathode current collector 20. However, the cathode 110 does not need to be perfectly perpendicular to the cathode current collector 20 and may be disposed at an incline with respect to the cathode current collector 20. The cathode 110 may be adhered and fixed to the cathode current collector 20 using a conductive adhesive. The conductive adhesive may include, but is not limited to, conductive epoxy or a metallic paste.

At least a portion of the support member 220 may include an electrically insulating material. Thus, the support member 220 may prevent electrical contact between the cathode current collector 20 and the anode 130.

Inside the cathode 110, an inner current collector 21 may be disposed. The inner current collector 21 may be inserted into the cathode 110. The inner current collector 21 may be electrically connected to the cathode current collector 20.

The inner current collector 21 may include a conductive metallic material. For example, the inner current collector 21 may include a conductive metallic material such as Cu, Au, Pt, Ag, Zn, Al, Mg, Ti, Fe, Co, Ni, Ge, In, Pd, or the like, or a combination thereof.

Since the inner current collector 21 is inserted into the cathode 110, delivery of electrons from the end portion of the cathode 110 adjacent to the electrolyte membrane 120 to the cathode current collector 20 may be facilitated. Thus, since metallic ions may be globally uniformly exchanged through the electrolyte membrane 120 between the cathode 110 and the anode 130, the height of the cathode 110 may be sufficiently high.

The inner current collector 21 may be disposed to protrude in a direction substantially perpendicular to the surface of the cathode current collector 20. However, the inner current collector 21 does not need to be perfectly perpendicular to the cathode current collector 20 and may be disposed at an incline with respect to the cathode current collector 20.

The cathode current collector 20 and the inner current collector 21 may be bonded to each other after being separately manufactured. However, the cathode current collector 20 and the inner current collector 21 may also be manufactured integrally using the same conductive material.

Although the cathode current collector 20 and the inner current collector 21 are illustrated as having a flat plate form in the drawings, the cathode current collector 20 and the inner current collector 21 may not have the perfect flat plate form. For example, the cathode current collector 20 and the inner current collector 21 may have various forms including a fish bone form, a mesh form, a lattice form, or the like, or a combination thereof.

Figure 6:
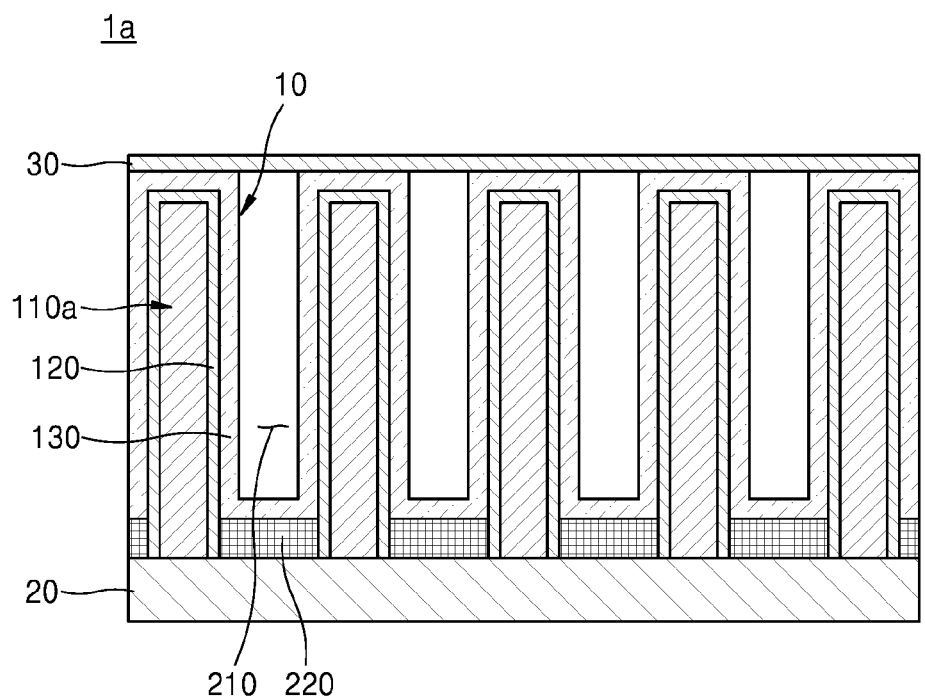
FIG. 6 is a cross-sectional view schematically showing a secondary battery according to another embodiment.

The inner current collector 21 is disposed inside the cathode 110 in FIGS. 1 and 2, and the inner current collector 21 may be an optional element. For example, as shown in FIG. 6, in a secondary battery 1a according to another embodiment, the inner current collector 21 may not be inserted into a cathode 110a of the unit cell 10.

The anode 130 of each unit cell 10 may be electrically connected to the anode current collector 30. For example, the anode 130 of each unit cell 10 may be in electrical contact with the anode current collector 30.

The anode current collector 30 may include a conductive metallic material such as Cu, Au, Pt, Ag, Zn, Al, Mg, Ti, Fe, Co, Ni, Ge, In, Pd, or the like, or a combination thereof.

The anode current collector 30 may be disposed in parallel with the cathode current collector 20. The anode current collector 30 may contact the top of the anode 130 of the unit cell 10.

However, the anode current collector 30 may or may not be disposed to have a flat plate form. For example, the anode current collector 30 may be bent along the length of the anode 130 and thus take on the shape of the anode 130.

Figure 7:
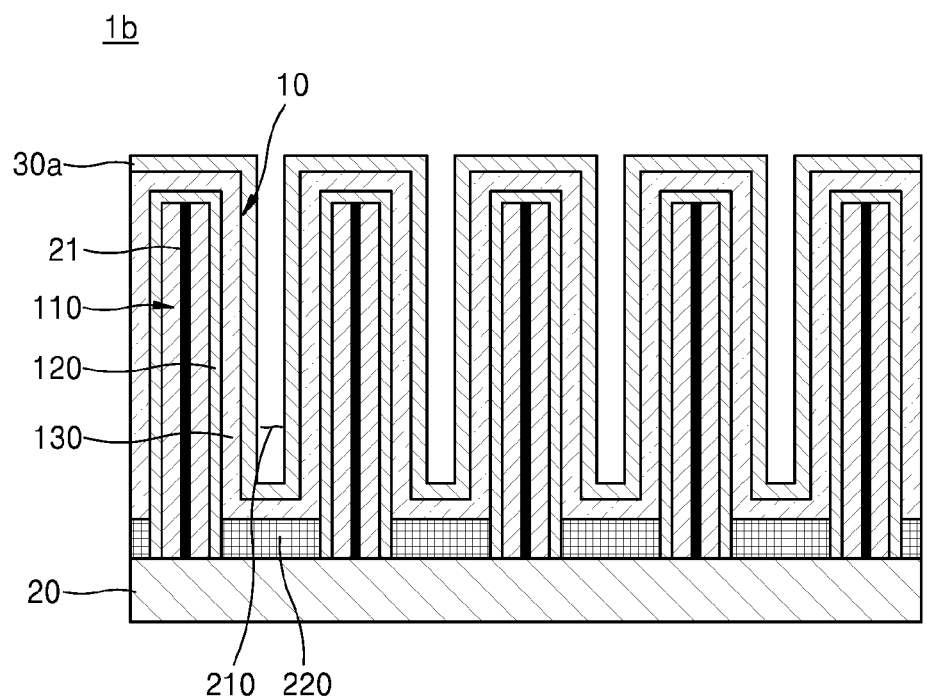
FIG. 7 is a cross-sectional view schematically showing a secondary battery according to yet another embodiment.

As shown in FIG. 7, an anode current collector 30a of a secondary battery 1b electrically contacts the surface of the anode 130 facing the cavity 210. The anode current collector 30a may work as a passivation layer that prevents the anode 130 from contacting external air. Thus, a chemical reaction between the anode 130 and external air may be suppressed.

Figure 8A:
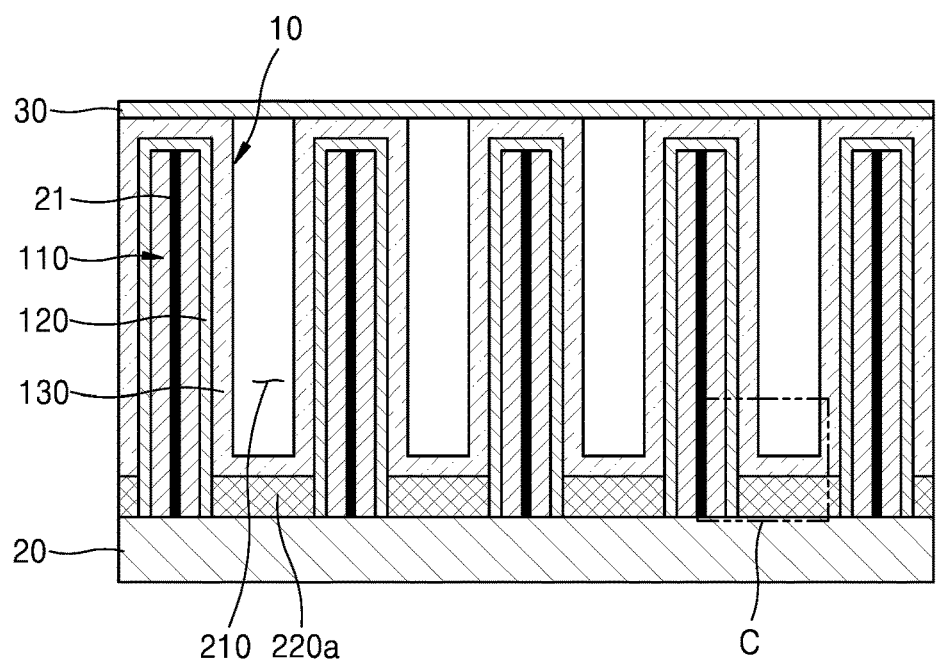
FIG. 8A is a cross-sectional view schematically showing a secondary battery according to another embodiment.
Figure 8B:
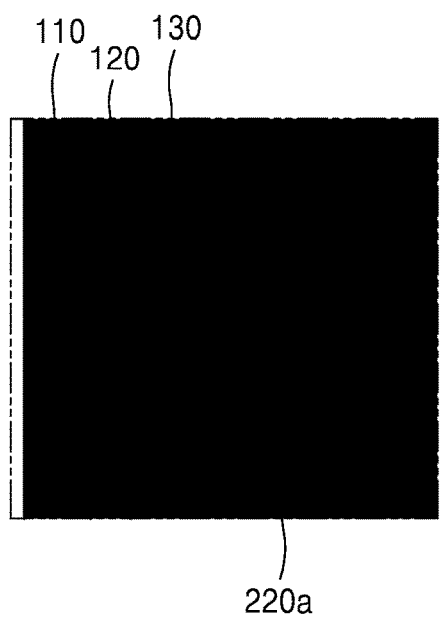
FIG. 8B is an enlarged view of a portion C in FIG. 8A, which illustrate the secondary battery as it is being charged.

FIG. 8A is a cross-sectional view schematically showing a secondary battery 1c according to another embodiment. FIG. 8B is an enlarged view of portion C in FIG. 8A, which illustrates the secondary battery 1c as it is being charged.

Referring to FIG. 8A, the secondary battery 1c according to the current embodiment may include the support member 220a. The other elements of the secondary battery 1c according to the current embodiment are the same as those of the secondary battery 1 of FIG. 2, and thus will not be described repetitively.

The support member 220a according to the current embodiment is capable of elastic deformation and also has ion conductivity. For example, the support member 220a may include, but is not limited to, a UV light-curable material capable of elastic deformation and having lithium salt ion conductivity.

Referring to FIG. 8B, since the support member 220a has ion conductivity, ions traveling from the portion of the cathode 110 which is adjacent to the support member 220a, e.g., ion flow starting below the cathode 110, have a globally uniform flow, thus inducing a uniform change in the volume of the anode 130.

Meanwhile, in the secondary batteries 1, 1a, 1b, and 1c, according to the above-described embodiments, the anode 130 is disposed on the upper surface of the electrolyte membrane 120, on a portion of the left side surface of the electrolyte membrane 120, and on a portion of the right side surface of the electrolyte membrane 120. However, the disposition of the anode 130 is not limited to the foregoing example, and the anode 130 may be disposed variously as long as the anode 130 surrounds at least a portion of the electrolyte membrane 120.

Figure 9:
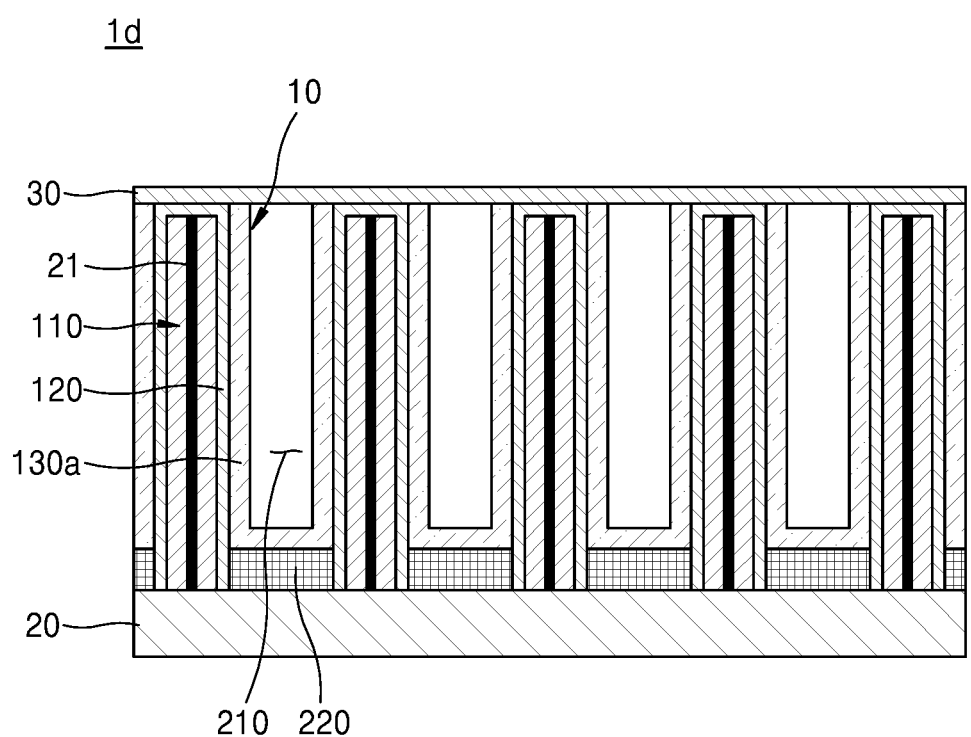
FIG. 9 is a cross-sectional view schematically showing a secondary battery according to another embodiment.

FIG. 9 is a cross-sectional view schematically showing a secondary battery 1d according to another embodiment. Referring to FIG. 9, another example will be described in which an anode 130a surrounds a portion of the electrolyte membrane 120. Referring to FIG. 9, the anode 130a is disposed on a portion of the left side surface of the electrolyte membrane 120 and on a portion of the right side surface of the electrolyte membrane 120, and may not be disposed on the upper surface of the electrolyte membrane 120. A portion of the anode current collector 30 contacts an end portion of the anode 130a, and another portion of the anode current collector 30 contacts the electrolyte membrane 120. The anode 130 electrically contacts the anode current collector 30.

FIGS. 10 through 21 are views describing a method of manufacturing the secondary battery 1 shown in FIG. 2.

Figure 10:
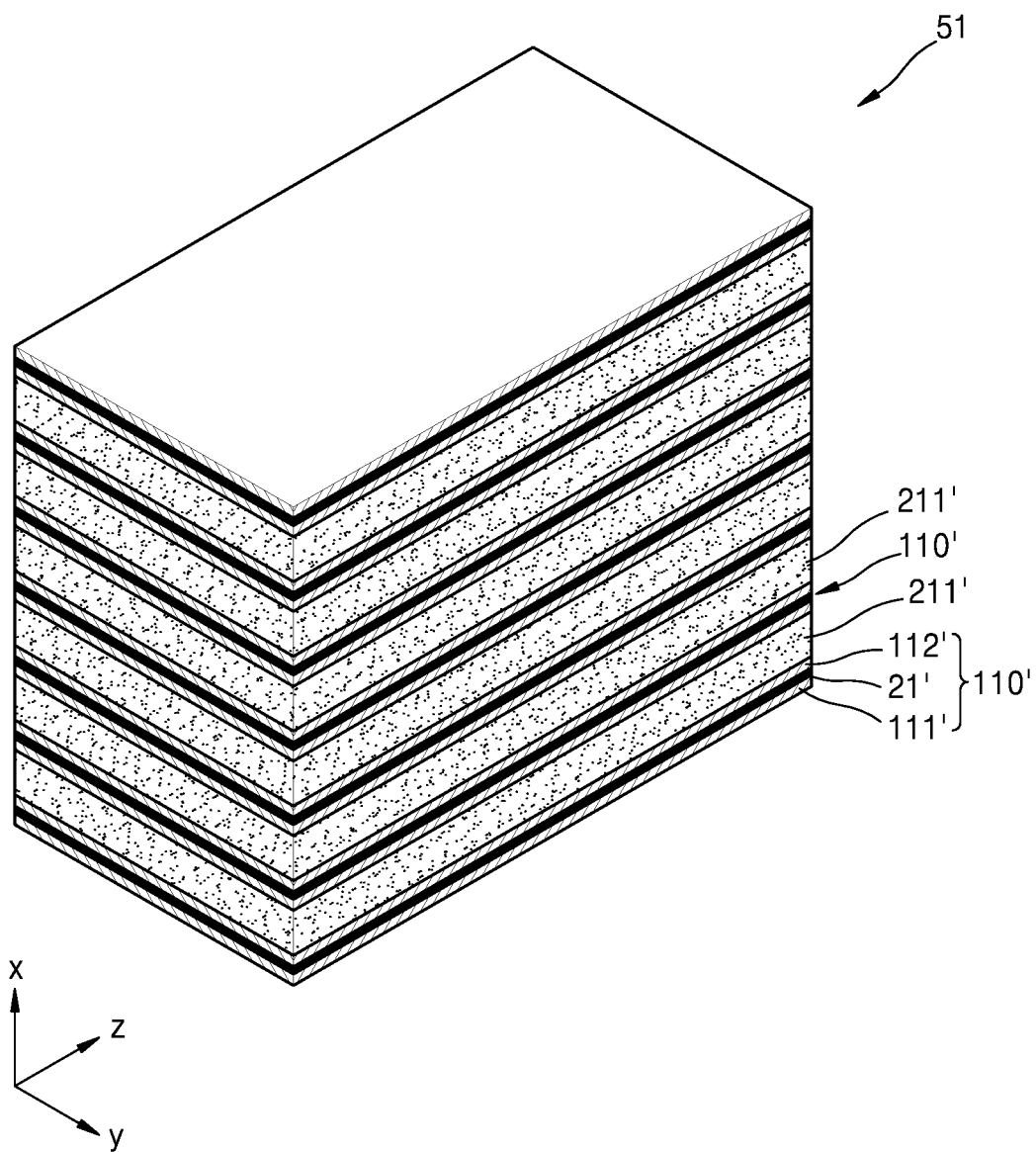
FIGS. 10 through 21 are views describing a method of manufacturing the secondary battery shown in FIG. 2.

Referring to FIG. 10, a thickness of a first cathode sheet 111' may be, but is not limited to, about 1 μm to about 30 μm. The first cathode sheet 111' may include a mixture of a cathode active material, a conductive material, and a binder. The first cathode sheet 111' may include a cathode active material alone, for example, without a conductive material or a binder. For example, the first cathode sheet 111' may include a sintered polycrystalline ceramic such as $LiCoO_2$. The first cathode sheet 111' may be manufactured using tape casting, but is not limited thereto.

After an inner current collector 21' is formed on the first cathode sheet 111', a second cathode sheet 112' is formed on the inner current collector 21'.

The inner current collector 21' is formed by applying a paste including a conductive metallic material on the first cathode sheet 111'. The conductive metallic material of the inner current collector 21' may include, but is not limited to, Cu, Au, Pt, Ag, Zn, Al, Mg, Ti, Fe, Co, Ni, Ge, In, Pd, or the like, or a combination thereof. The inner current collector 21' may have a thickness of, but is not limited to, less than or equal to about 1 μm.

The second cathode sheet 112' may include a mixture of a cathode active material, a conductive material, and a binder. The second cathode sheet 112' may include a cathode active material alone without a conductive material or a binder. For example, the second cathode sheet 112' may include a sintered polycrystalline ceramic such as $LiCoO_2$. A material of the second cathode sheet 112' may be the same as that of the first cathode sheet 111'. A thickness of the second cathode sheet 112' may be, but is not limited to, about 1 μm to about 30 μm.

By forming the first cathode sheet 111', the inner current collector 21', and the second cathode sheet 112' in this manner, a cathode 110' may be formed.

A sacrificial layer 211' is stacked on the cathode 110'. The sacrificial layer 211' may be stacked on the second cathode sheet 112' of the cathode 110'. The plurality of cathodes 110' and a plurality of sacrificial layers 211' may be alternately stacked.

The number of times the cathodes 110' and the sacrificial layers 211' are stacked on one another may be, but is not limited to, about one to about 2,000 times.

The sacrificial layer 211' may include a material that may be selectively removed in a subsequent process.

For example, the sacrificial layer 211' may include a material that may be capable of being removed by being volatilized at a high temperature, e.g., the sacrificial layer may include a carbon-based material, a polymer-based material, or a combination thereof. The carbon-based material may include, but is not limited to, graphite. The polymer-based material may include, but is not limited to, polyvinyl butyral (PVB), polyvinyl alcohol (PVA), or the like, or a combination thereof.

In another example, the sacrificial layer 211' may include a material that may be removed by etching. For example, the sacrificial layer 211' may include an inorganic oxide, e.g., silica ($SiO_2$). For example, the sacrificial layer 211' may be a sheet including $SiO_2$, $LiSiO_4$, $LiCoSiO_4$, or the like, or a combination thereof.

A stacked structure 51 may be manufactured by, but is not limited to, a method such as general tape casting with respect to the first cathode sheet 111', the inner current collector 21', the second cathode sheet 112', and the sacrificial layer 211', sequentially stacking them, and then performing sintering at a temperature of about 800° C. to about 1100° C.

Figure 11:
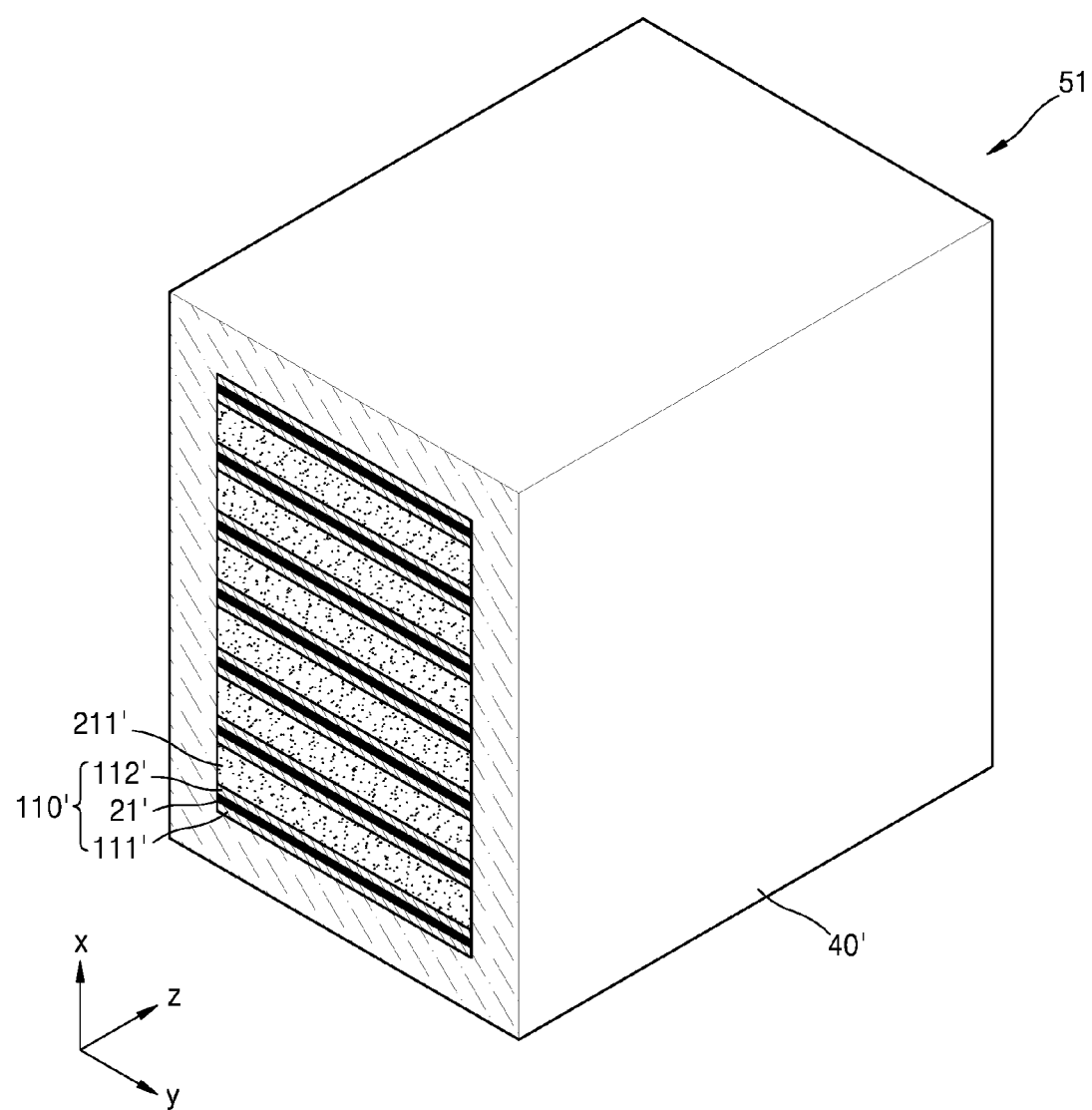

Referring to FIG. 11, a support frame 40' surrounding the stacked structure 51 may be formed along an edge of the stacked structure 51. The stacked structure 51 may be supported by the support frame 40' on opposite end portions in the left to right direction y and opposite end portions in the front to rear direction z.

Figure 12:
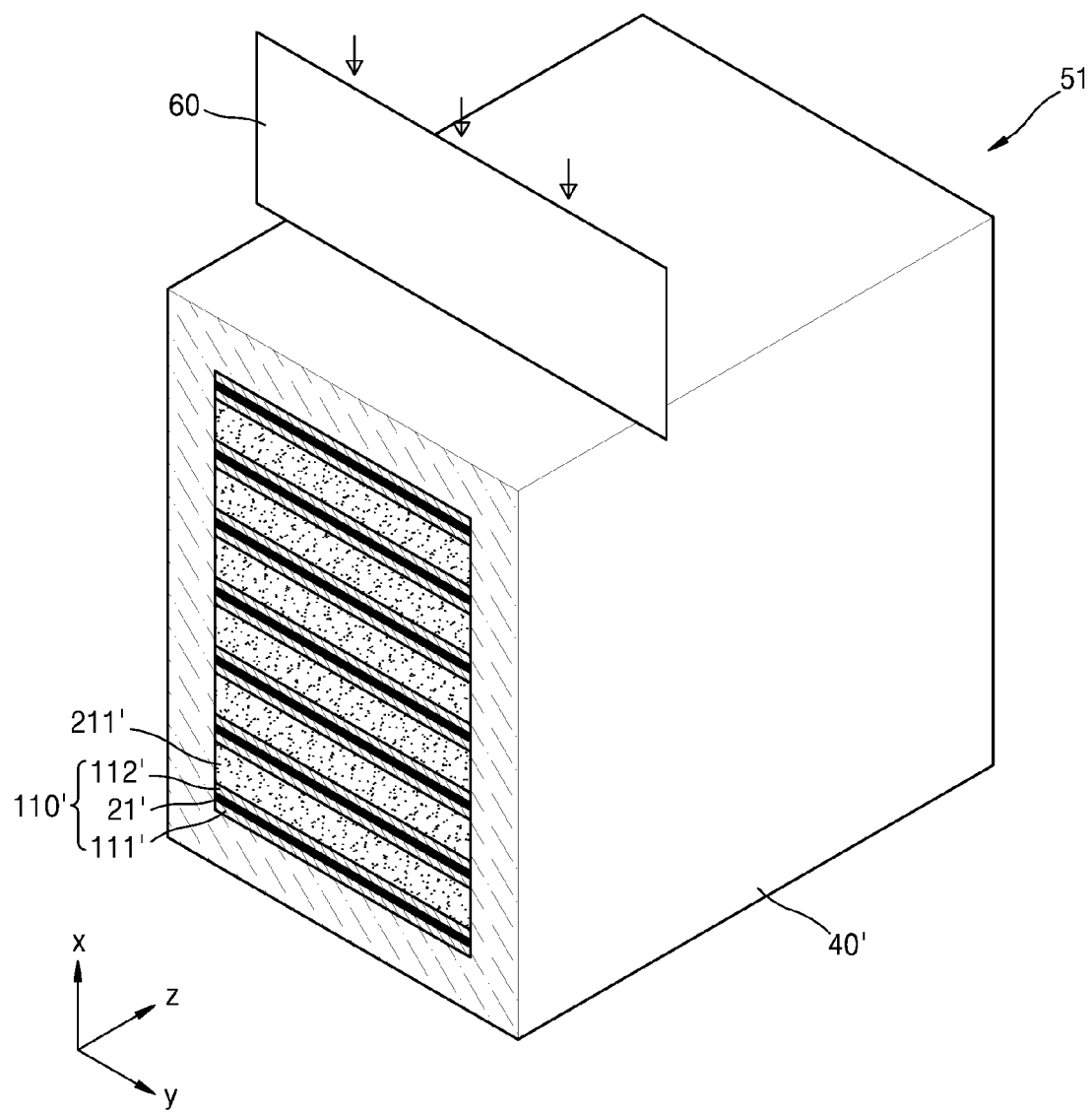

The material of the support frame 40' may be such that the support frame 40' supports the stacked structure 51 and is not removed in a subsequent process of removing the sacrificial layer 211'. For example, the material of the support frame 40' may include, but is not limited to, a polymer epoxy. Referring to FIG. 12, when the stacked structure 51 including the plurality of cathodes 110' and the plurality of sacrificial layers 211' are alternately stacked is supported by the support frame 40' along the outside of the stacked structure 51, the stacked structure 51 is cut using a cutting member 60 such as a saw, and is thereby divided into a plurality of stacked structures 52, each having a desired, predetermined size.

Figure 13:
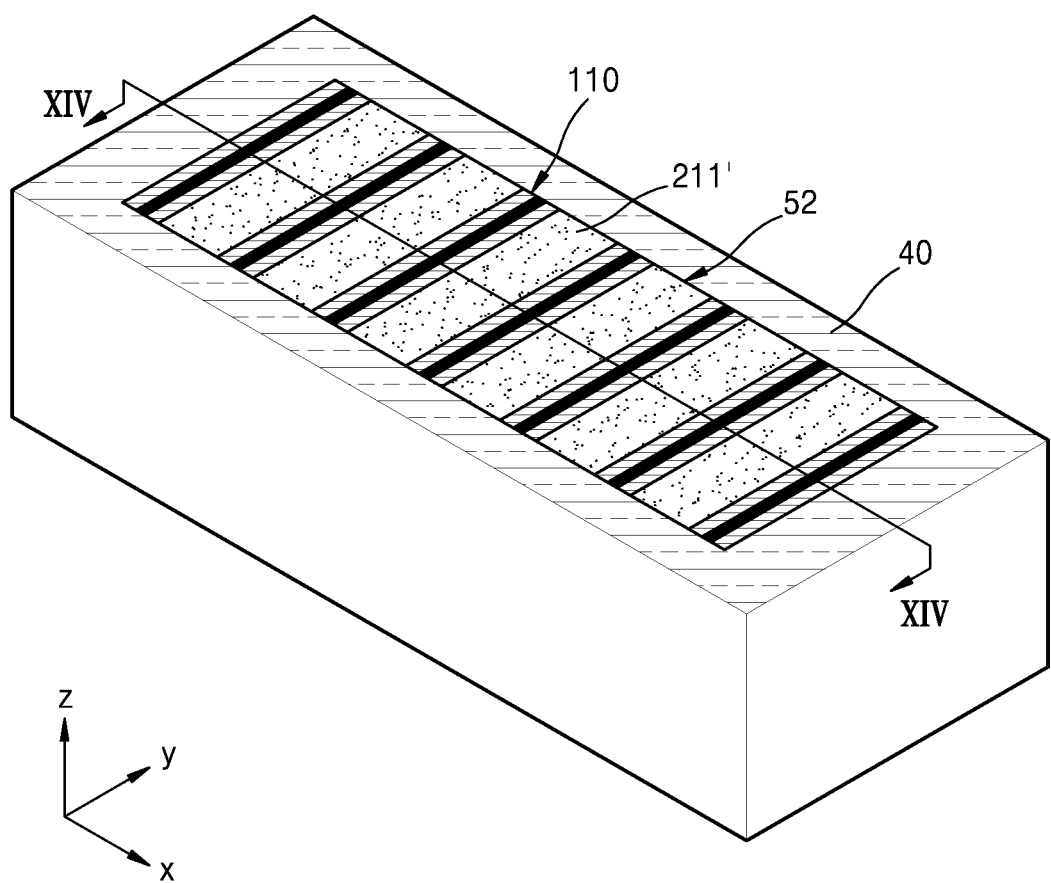

FIG. 13 shows one of the plurality of stacked structures 52 into which the stacked structure 51 is divided when cut. In the stacked structure 52, a plurality of cathodes 110 and a plurality of sacrificial layers 211' are alternately stacked in the left to right direction. The cathode 110 may be structured such that the first cathode sheet 111, the inner current collector 21, and the second cathode sheet 112 are sequentially stacked in the left to right direction.

Figure 14:
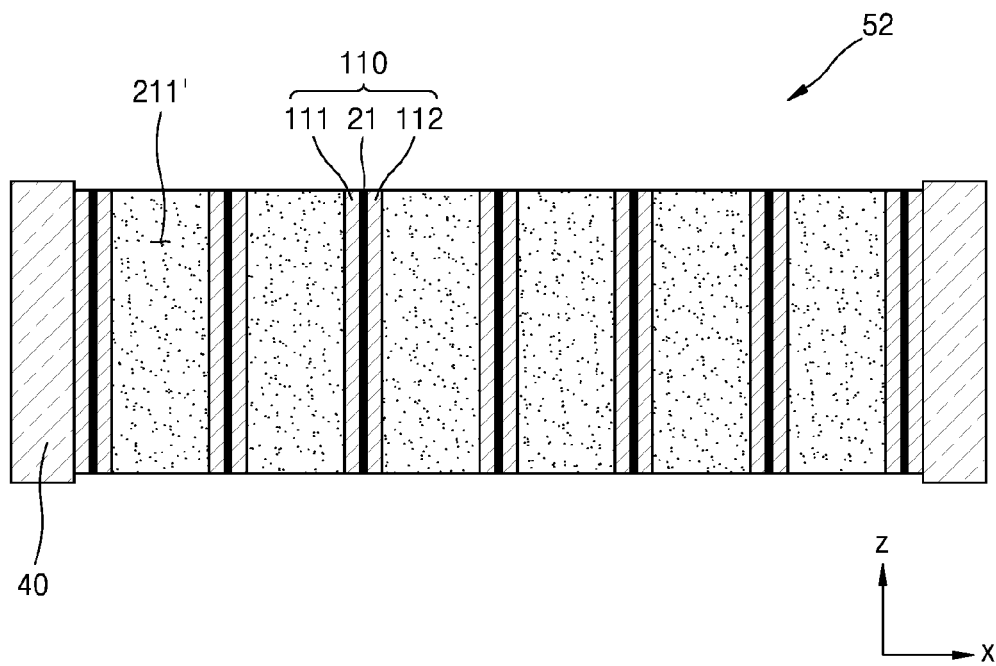

The stacked structure 52 is supported by the support frame 40 at opposite ends in the left to right direction and opposite end portions in the front to rear direction. FIG. 14 is a cross-sectional view of FIG. 13. Referring to FIG. 14, the stacked structure 52 may be supported by the support frame 40 on opposite ends in the left to right direction.

The material of the support frame 40 may be such that the support frame 40 supports the stacked structure 52 and is not removed in a subsequent process of removing the sacrificial layer 211'. For example, the material of the support frame 40 may include, but not limited to, polymer epoxy.

Figure 15:
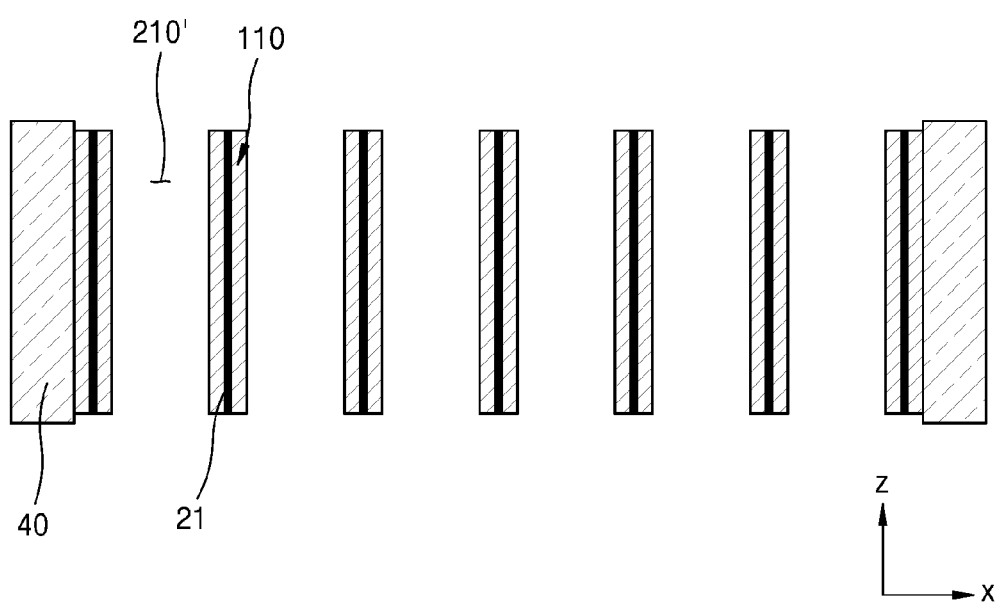

Referring to FIG. 15, the sacrificial layer 211' is removed from the stacked structure 52. In an example, the sacrificial layer 211' may be removed by etching that selectively etches the sacrificial layer 211'. A wet etching or a dry etching may be used. In another example, the sacrificial layer 211' may be removed by being volatilized using a thermal treatment.

Once the sacrificial layer 211' is removed, the cathode 110 having a three-dimensional (3D) structure is completed. When the sacrificial layer 211 is removed, the cathode 110 is in a state of being supported by the support frame 40. The plurality of cathodes 110 may be arranged to be spaced apart from each other in the left to right direction, and cavities 210' exist between the plurality of cathodes 110.

Figure 16:
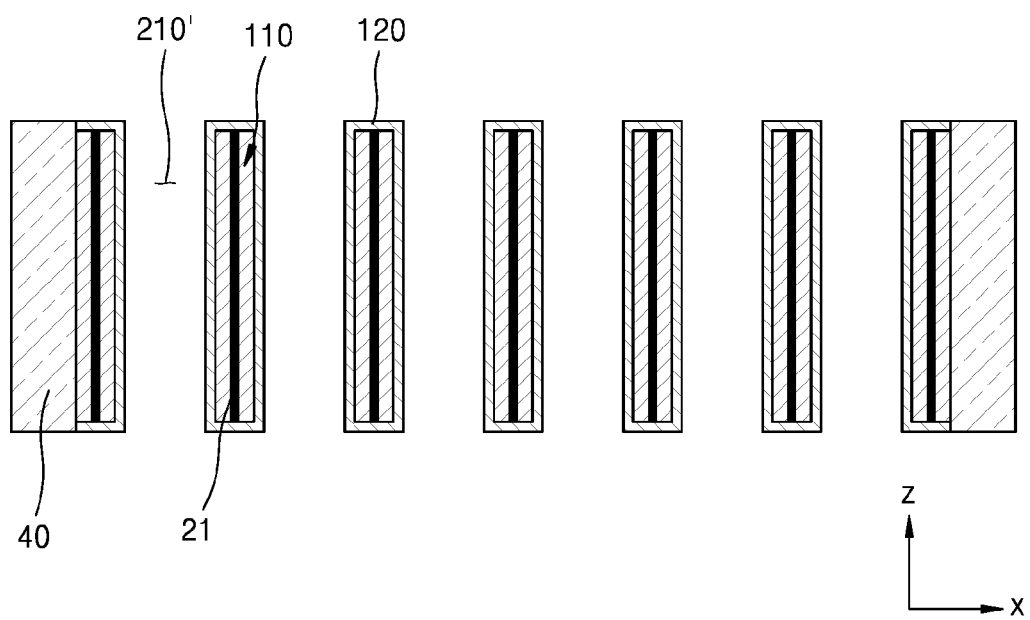

Referring to FIG. 16, the electrolyte membranes 120 are formed on the cathodes 110 which are arranged to be spaced apart from each other. For example, the electrolyte membrane 120 is formed on the surface of the cathode 110. The electrolyte membrane 120 may be deposited on the surface of the cathode 110 using a method including chemical vapor deposition (CVD), metal-organic CVD (MOCVD), sputtering, or the like, or a combination thereof. The electrolyte membrane 120 may be deposited on the surface of the cathode 110 and may have a uniform thickness. The thickness of the electrolyte membrane 120 may be about 2 μm or less. The electrolyte membrane 120 may be formed on the other surfaces of the cathode 110 except for the surface facing the support frame 40.

The electrolyte membrane 120 may include a solid electrolyte such as $Li_3PO_4$, $Li_3PO_4$-xNx, $LiBO_2$-xNx, $Li_3PO_4Nx$, $LiBO_2Nx$, $Li_4SiO_4$—$Li_3PO_4$, $Li_4SiO_4$—$Li_3VO_4$, or the like, or a combination thereof.

Figure 17:
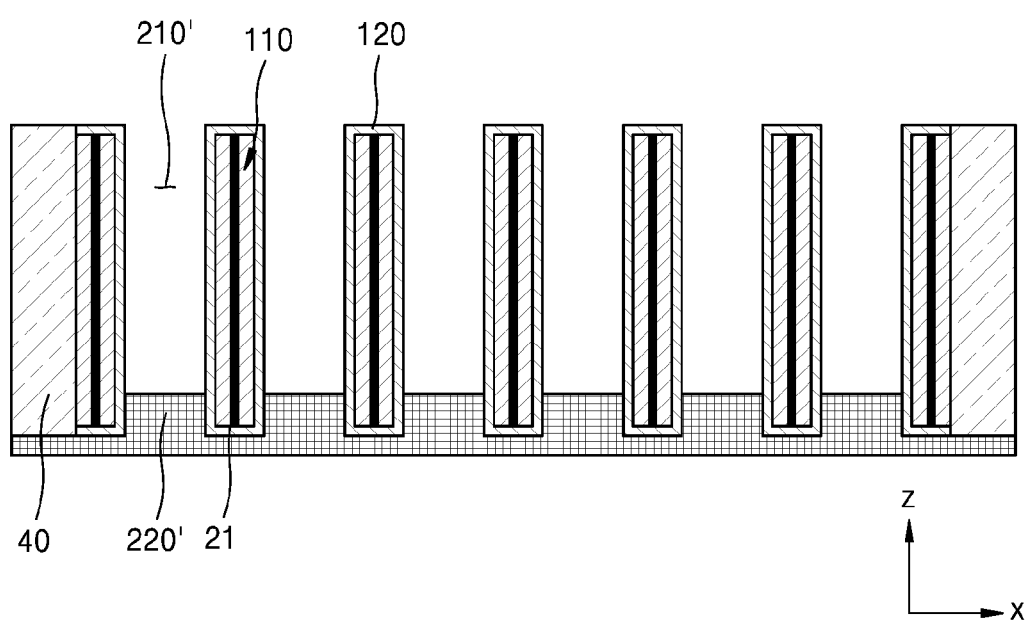

Referring to FIG. 17, a portion of the electrolyte membrane 120 formed on the surface of the cathode 110 is inserted or dipped into a pre-support member 220' in a liquid state. The pre-support member 220' may include a material that may be cured by heat or UV light. For example, the pre-support member 220' may include, but is not limited to, a polymer epoxy.

When the portion of the electrolyte membrane 120 is inserted into the pre-support member 220', the pre-support member 220' is cured by heat or UV light. The pre-support member 220' is cured and thus enters a solid state, such that the cathode 110 surrounded by the electrolyte membrane 120 is supported by the pre-support member 220 in such a way not to fall or collapse.

Figure 18:
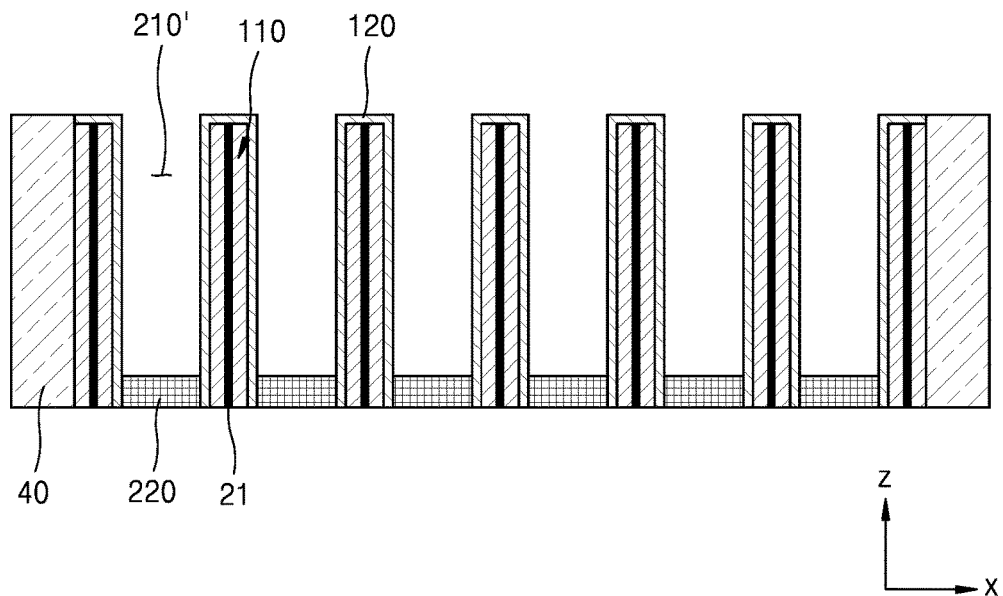

Referring to FIG. 18, to expose a bottom of the cathode 110, a portion of the pre-support member 220' and a portion of the electrolyte membrane 120 may be removed. For example, the pre-support member 220' and the electrolyte membrane 120 disposed in a lower portion of the cathode 110 may be removed.

The pre-support member 220' and the electrolyte membrane 120 disposed in a lower portion of the cathode 110 may be removed using, for example, a polishing method. For example, to remove the pre-support member 220' and the electrolyte membrane 120, mechanical polishing may be used without being limited thereto. For example, the method of plasma ashing may also be used.

Using polishing, the lower portion of the cathode 110 is exposed and the support member 220 disposed between the electrolyte membranes 120 may be formed. In this case, a lower portion of the support frame 40 may be partially removed, without being limited thereto.

The support member 220 may have a height that is from about 5% to about 15% of a height of the cathode 110. The support member 220 may have a height that is greater than a thickness of the electrolyte membrane 120.

Figure 19:
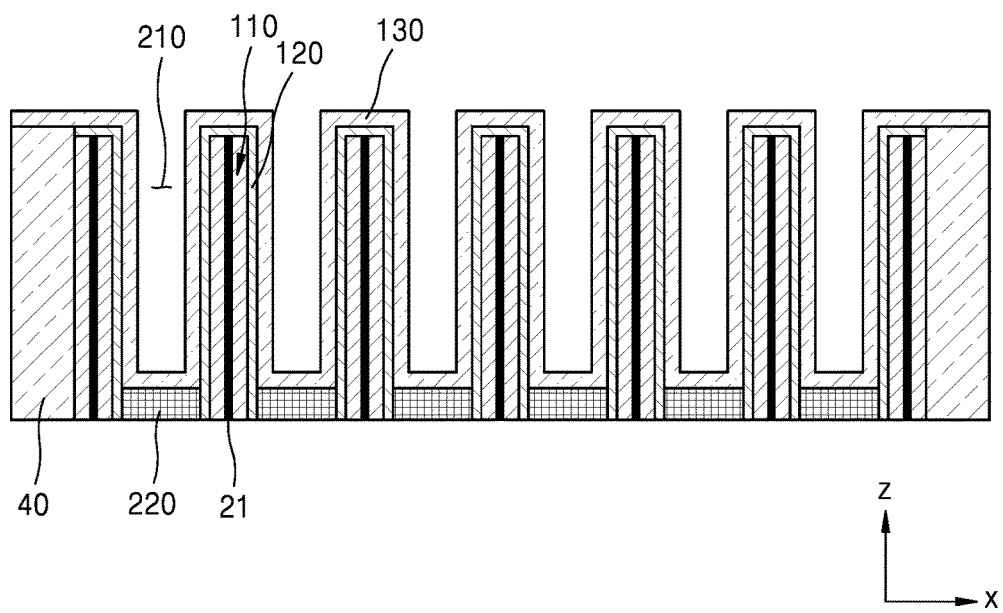

Referring to FIG. 19, the anode 130 is formed on the electrolyte membrane 120. For example, the anode 130 may be formed on the surface of the electrolyte membrane 120 to surround at least a portion of the electrolyte membrane 120. The anode 130 may be formed on each of the plurality of electrolyte membranes 120 and the support members 220 disposed therebetween, and thus along the shapes of the plurality of electrolyte membranes 120 and the support members 220. The anode 130 may be formed on a portion of the left side surface, the upper surface, and the right side surface of the electrolyte membrane 120 and on the upper surface of the support member 220. Thus, the plurality of unit cells 10, each including the cathode 110, the electrolyte membrane 120, and the anode 130, may be spaced apart from each other in the left to right direction. The anodes 130 in the adjacent unit cells 10 are connected to each other, and the support member 220 is disposed below the anode 130.

The cavities 210 exist between the unit cells of the plurality of unit cells 10. The cavity 210 may be designed to have a left to right width that is from about one time to about five times as large as the thickness of the anode 130. The cavity 210 may be designed to have a left to right width that is from about one time to about five times as large as a left to right width of the cathode 110.

Figure 20:
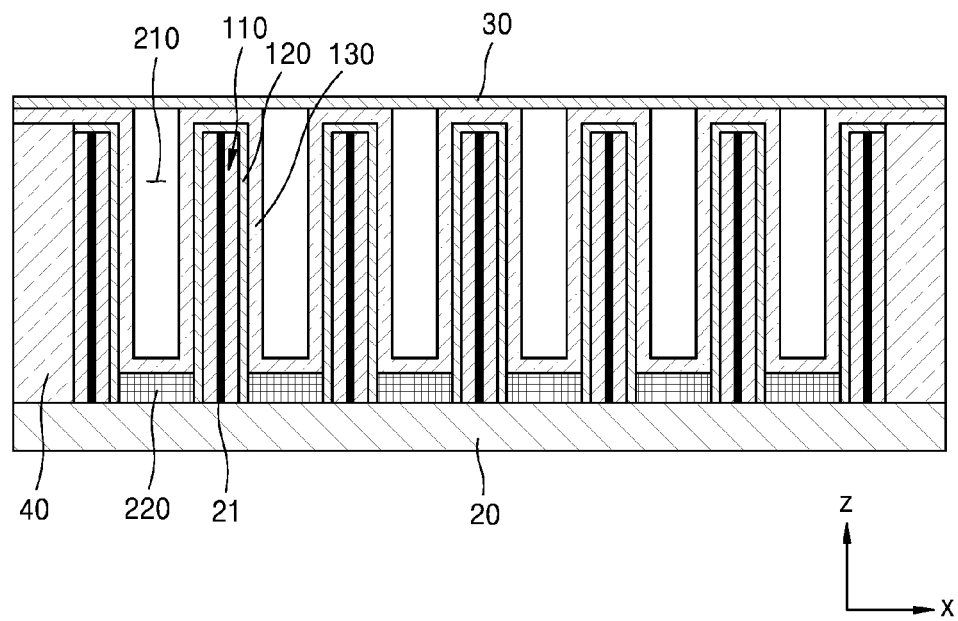

Referring to FIG. 20, the anode current collector 30 is formed on the anode 130 and the cathode current collector 20 is formed below the cathode 110. The anode current collector 30 is electrically connected to the anode 130, and the cathode current collector 20 is electrically connected to the cathode 110. The anode current collector 30 and the cathode current collector 20 may be disposed in parallel to each other. The cathode current collector 20 and the cathode 110 may be electrically connected using a conductive adhesive. The conductive adhesive may include, but is not limited to, a conductive epoxy, a metallic paste, or a combination thereof.

The anode current collector 30 and the cathode current collector 20 may include a conductive metallic material such as Cu, Au, Pt, Ag, Zn, Al, Mg, Ti, Fe, Co, Ni, Ge, In, Pd, or the like, or a combination thereof.

The cathode current collector 20 electrically contacts the inner current collector 21 disposed inside the cathode 110. The plurality of cathodes 110 may be disposed vertically on the cathode current collector 20. The plurality of inner current collectors 21 may be disposed vertically on the cathode current collector 20.

Figure 21:
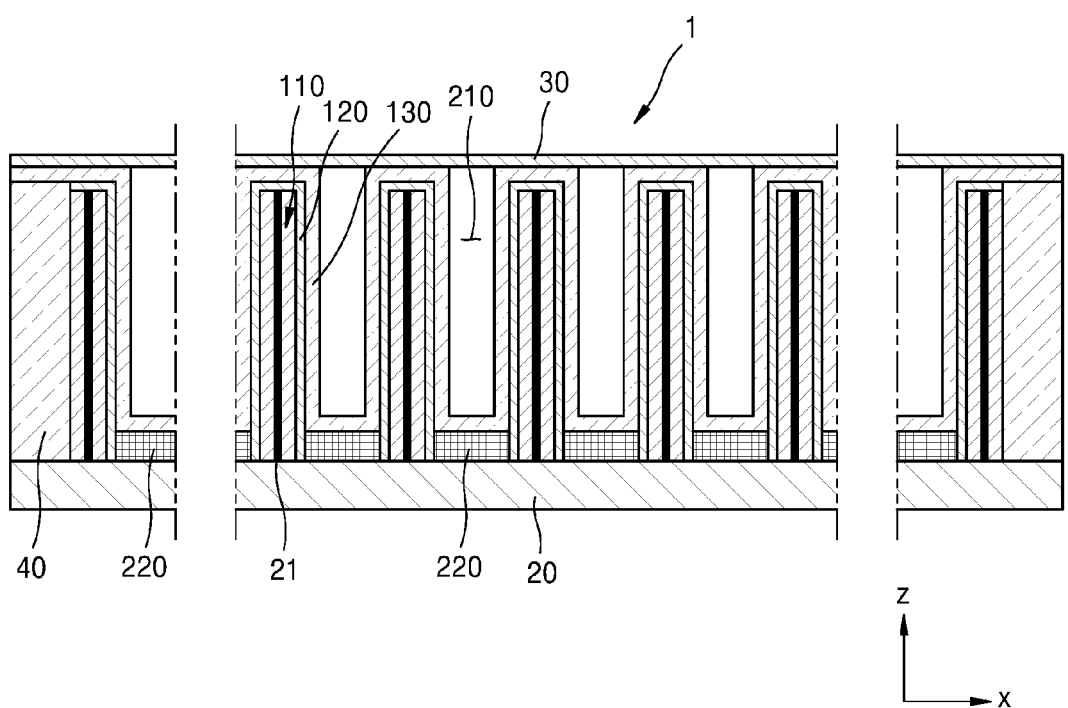

Referring to FIG. 21, portions of the opposite ends where the support frame 40 is formed are removed from the structure of FIG. 20. In this way, the secondary battery 1 of FIG. 2 is manufactured.

However, the support frame 40 may or may not be removed from the secondary battery 1, and the secondary battery 1 may be used without removal of the support frame 40 as shown in FIG. 20.

Although a process of manufacturing the secondary battery 1 of FIG. 2 has been described in the foregoing embodiment, the description may also be applied to a process of manufacturing the secondary battery 1c shown in FIG. 8. In the process of manufacturing the secondary battery 1c of FIG. 8, the operations are equally applied with the exception that the support member 220a is replaced with a material having ion conductivity or such a support member 220a is added.

FIGS. 22 through 32 are views describing a method of manufacturing the secondary battery 1a shown in FIG. 6.

Figure 22:
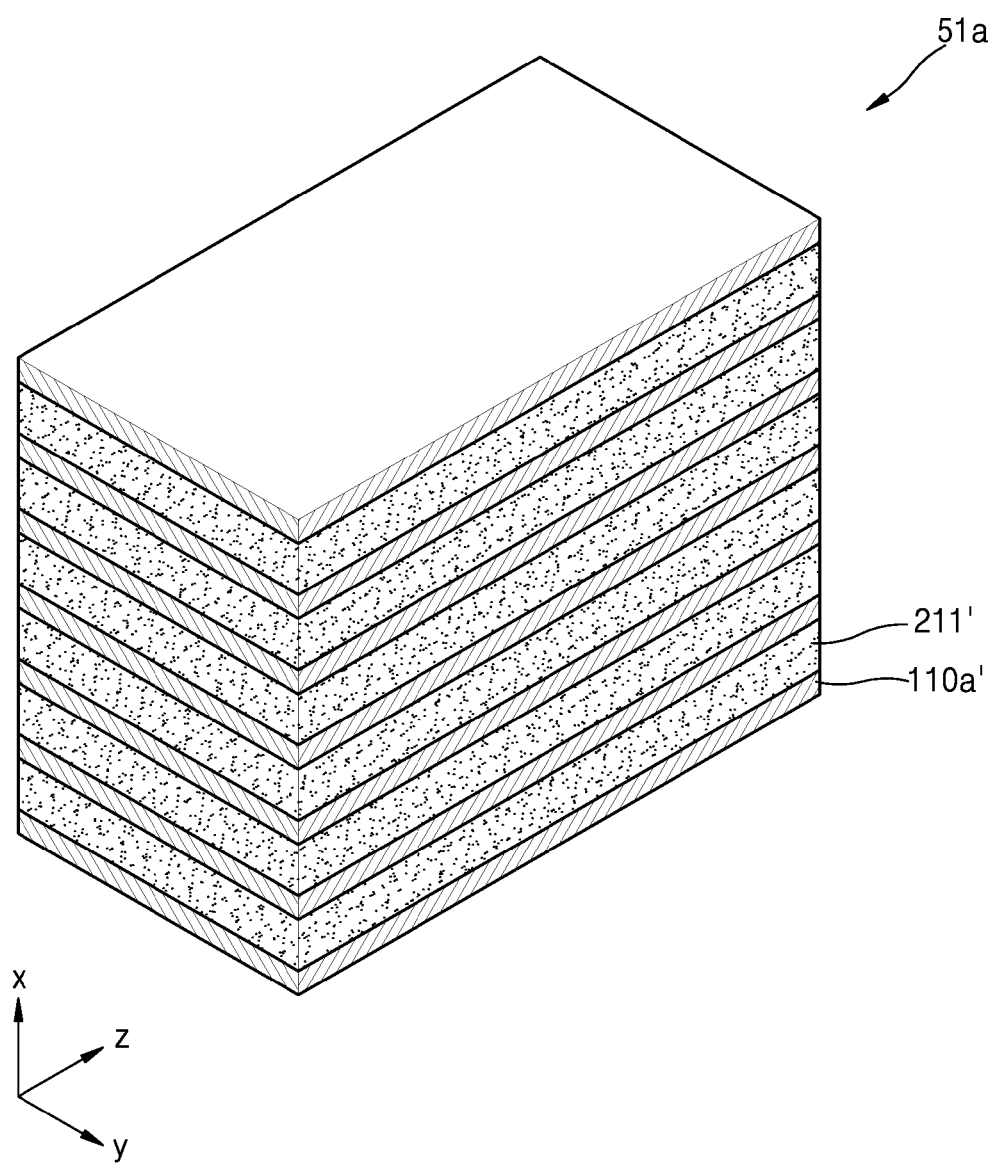
FIGS. 22 through 32 are views describing a method of manufacturing the secondary battery shown in FIG. 6.

Referring to FIG. 22, the sacrificial layer 211' is stacked on a cathode 110a'. The plurality of cathodes 110a' and the plurality of sacrificial layers 211' may be alternately stacked.

Herein, the number of times the cathodes 110a' and the sacrificial layers 211' are stacked may be, but is not limited to, about 1 to about 2,000 times.

The sacrificial layer 211' may include a material that may be selectively removed in a subsequent process. The sacrificial layer 211' may include a material that may be removed by being volatilized at high temperature, e.g., at least one of a carbon-based material, a polymer-based material, or a combination thereof. The carbon-based material may include, but is not limited to, graphite. The polymer-based material may include, but is not limited to, polyvinyl butyral (PVB), polyvinyl alcohol (PVA), or the like, or a combination thereof. In another example, the sacrificial layer 211' may include a material that may be removed by etching. For example, the sacrificial layer 211' may include an inorganic oxide, e.g., silica ($SiO_2$). For example, the sacrificial layer 211' may be a sheet including $SiO_2$, $LiSiO_4$, $LiCoSiO_4$, or the like, or a combination thereof.

Figure 23:
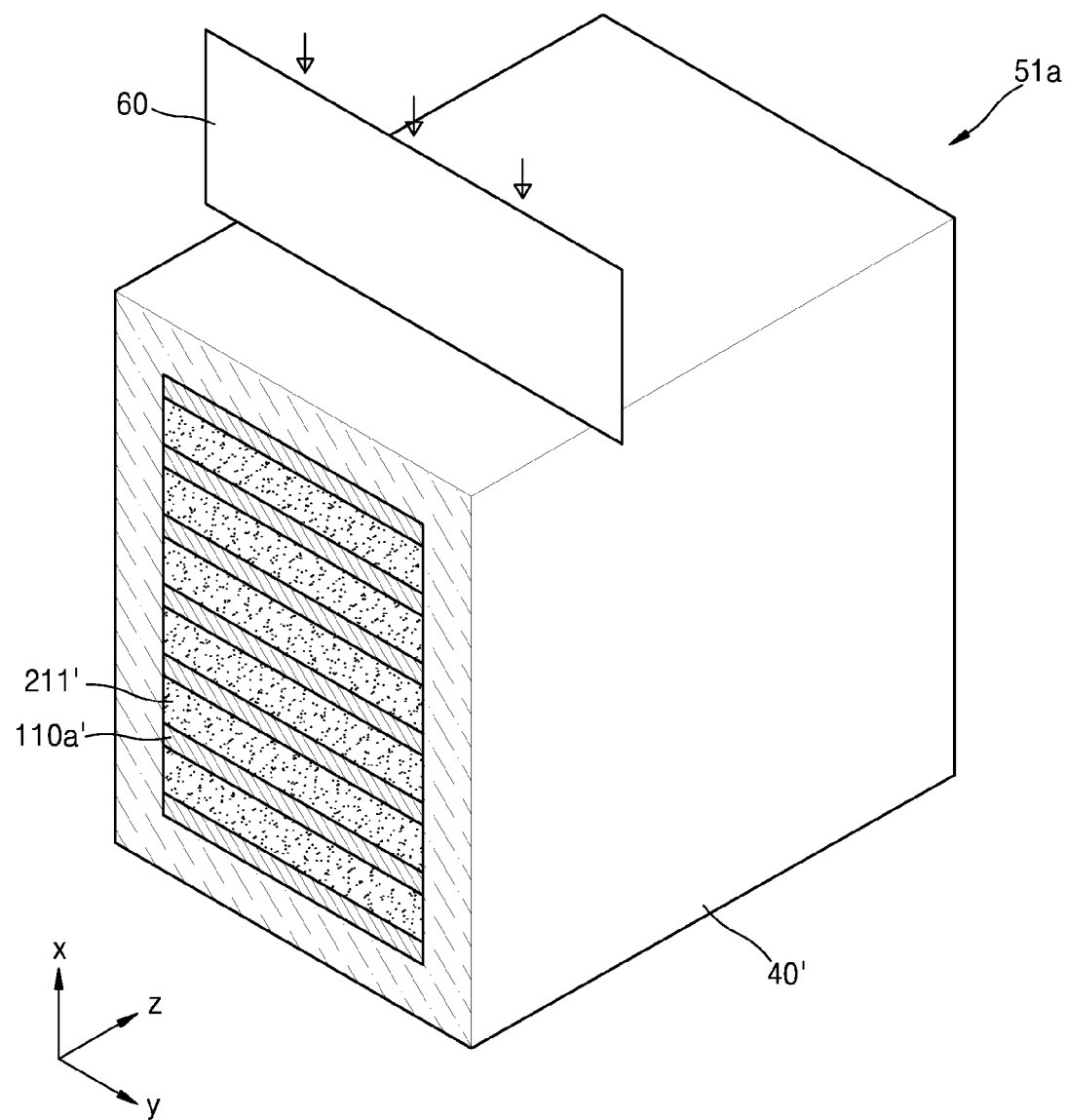

Referring to FIG. 23, the support frame 40' surrounding a stacked structure 51a may be formed along an edge of the stacked structure 51a. The stacked structure 51a may be supported by the support frame 40' on opposite ends in the left to right direction and on opposite ends in the front to rear direction.

When the stacked structure 51a, in which the plurality of cathodes 110a' and the plurality of sacrificial layers 211' are alternately stacked, is supported by the support frame 40' along the edge of the stacked structure 51a, the stacked structure 51a is cut using the cutting member 60 such as a saw, and is thereby divided into a plurality of stacked structures 52a, each having a desired size. In the stacked structure 52a, the plurality of cathodes 110a and the plurality of sacrificial layers 211' are stacked alternately in the left to right direction.

Figure 24:
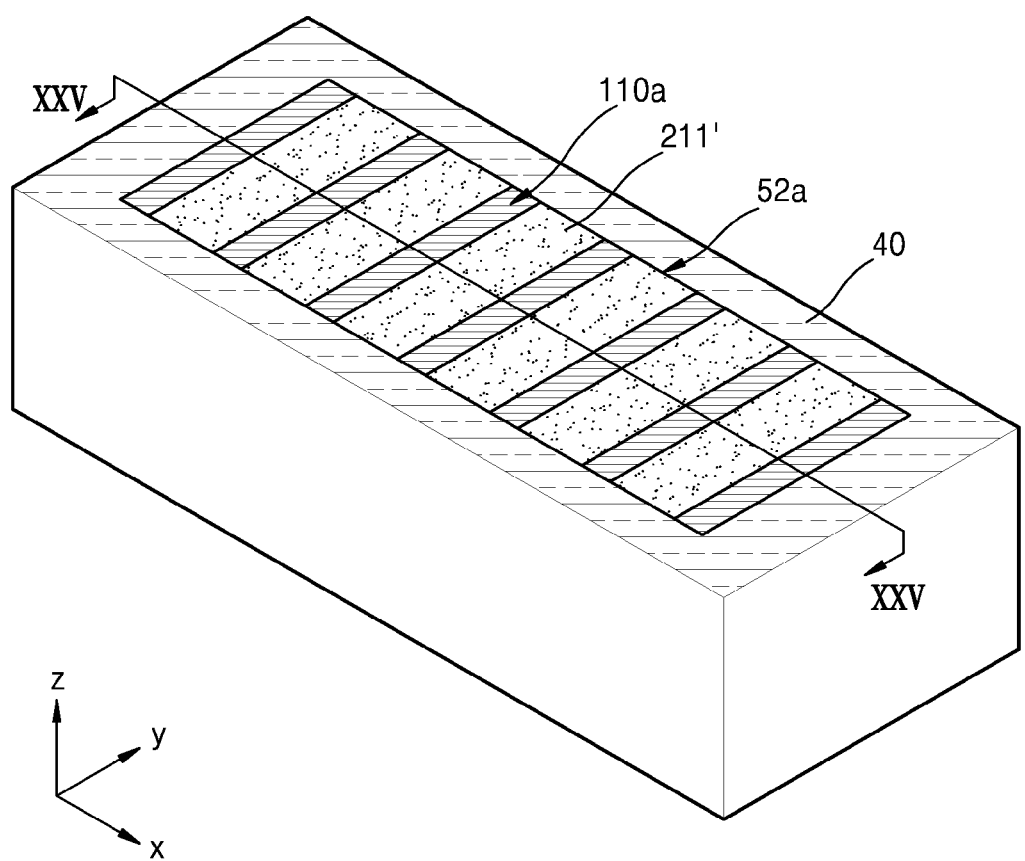
Figure 25:
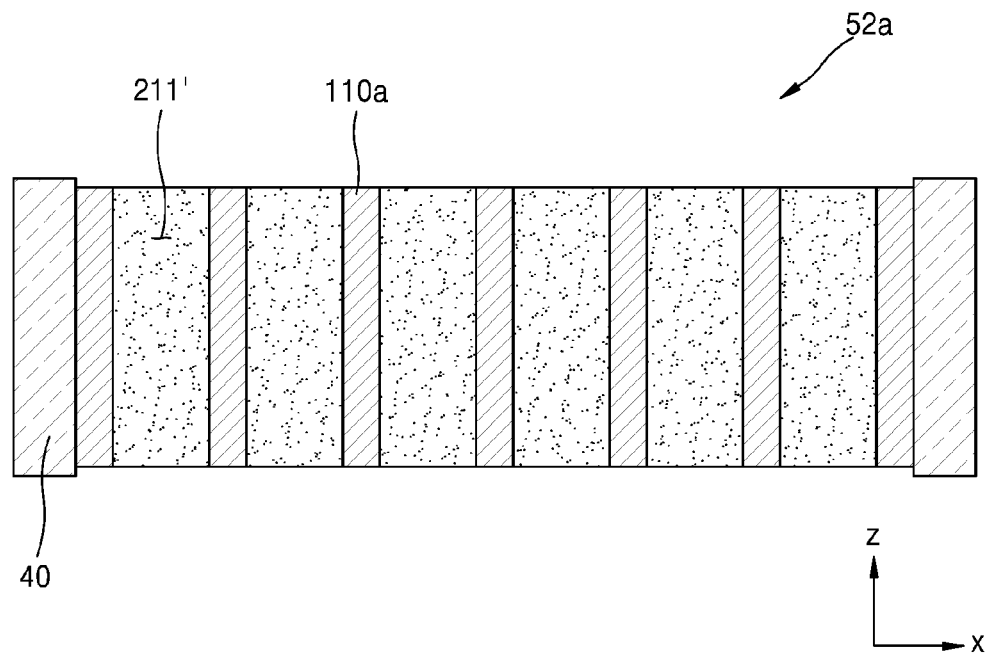

Referring to FIG. 24, the stacked structure 52a may be supported by the support frame 40 on opposite end portions in the left to right direction and on opposite end portions in the front-rear direction. FIG. 25 is a cross-sectional view of FIG. 24. Referring to FIG. 25, the stacked structure 52a may be supported by the support frame 40 on opposite end portions in the left to right direction.

The material of the support frame 40 may support the stacked structure 52a, and may include a material that is not removed in a subsequent process of removing the sacrificial layer 211'. For example, the material of the support frame 20 may include epoxy.

Figure 26:
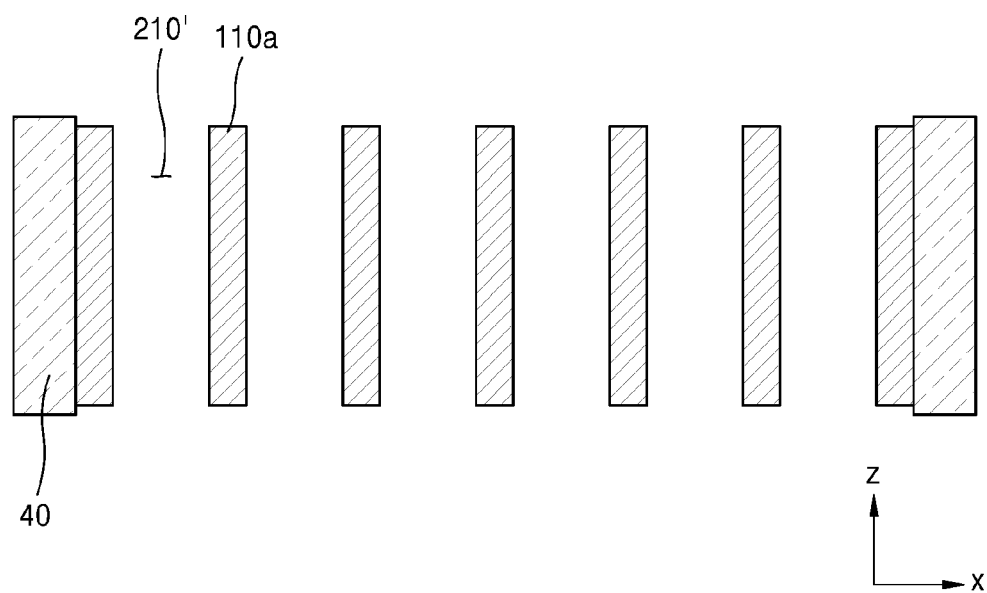

Referring to FIG. 26, the sacrificial layer 211' is removed from the stacked structure 52a. In an example, the sacrificial layer 211' may be removed by an etching process that selectively etches the sacrificial layer 211'. A wet etching or a dry etching may be used. In another example, the sacrificial layer 211' may be removed by being volatilized using a thermal treatment.

Once the sacrificial layer 211' is removed, the cathode 110a having a 3D structure is completed. When the sacrificial layer 211' is removed, the cathode 110a is in a state of being supported by the support frame 40. The plurality of cathodes 110a may be arranged to be spaced apart from each other in the left to right direction.

Figure 27:
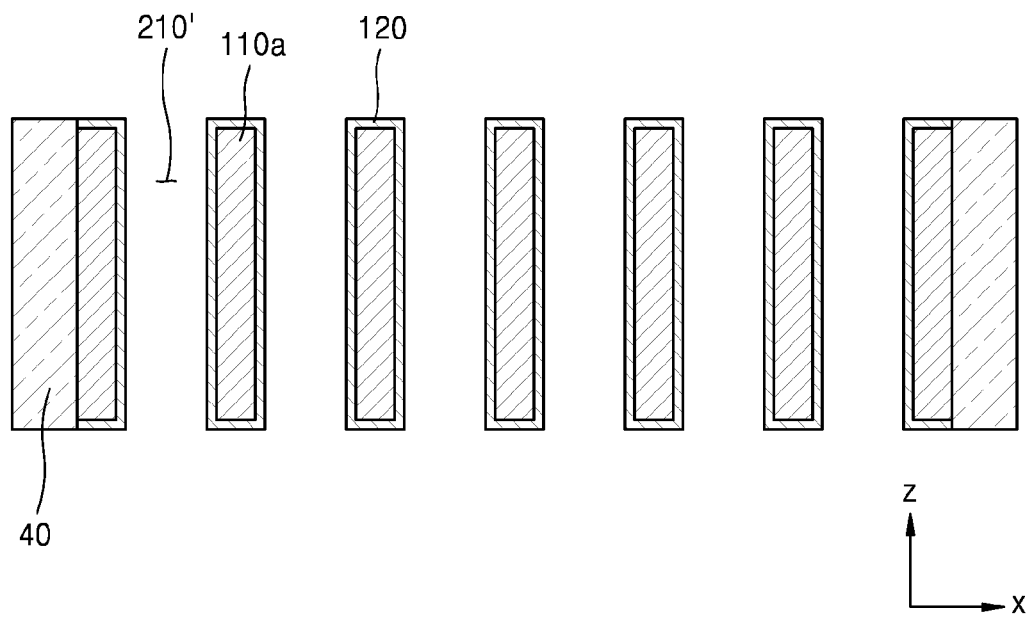

Referring to FIG. 27, the electrolyte membranes 120 are formed on the cathodes 110a arranged to be spaced apart from each other. For example, the electrolyte membrane 120 is formed on the surface of the cathode 110a. The electrolyte membrane 120 may be deposited on the surface of the cathode 110a using a method including CVD, MOCVD, sputtering, or the like, or a combination thereof. The electrolyte membrane 120 may be deposited on the surface of the cathode 110a to have a uniform thickness. The thickness of the electrolyte membrane 120 may be less than or equal to about 2 μm. The electrolyte membrane 120 may be formed on the other surfaces of the cathode 110a with the exception of the surface facing the support frame 40.

The electrolyte membrane 120 may include a solid electrolyte such as $Li_3PO_4$, $Li_3PO_4$-xNx, $LiBO_2$-xNx, $Li_3PO_4Nx$, $LiBO_2Nx$, $Li_4SiO_4$—$Li_3PO_4$, $Li_4SiO_4$—$Li_3VO_4$, or the like, or a combination thereof.

Figure 28:
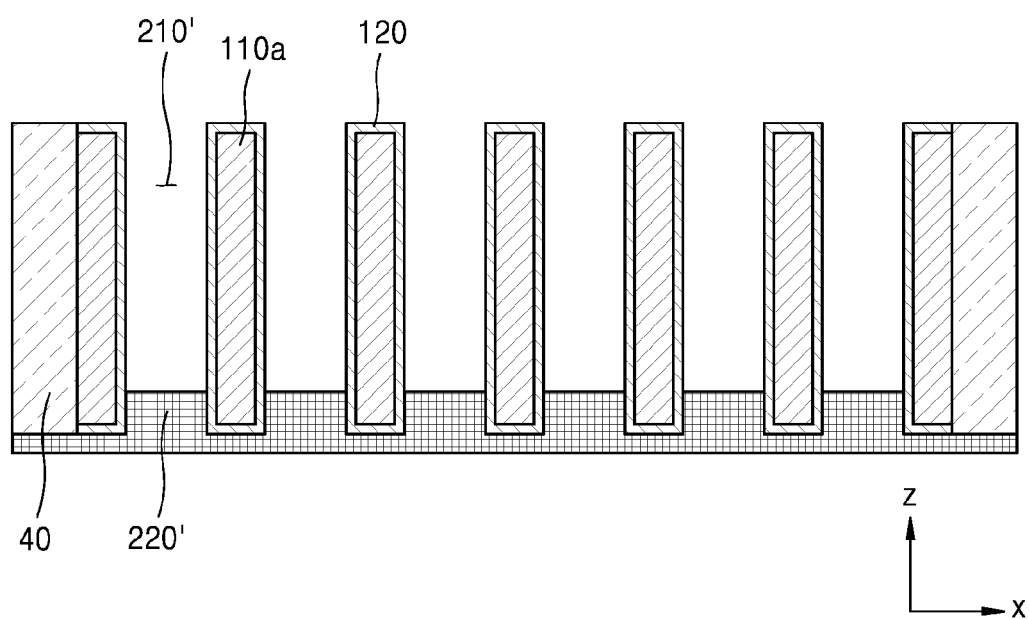

Referring to FIG. 28, a portion of the electrolyte membrane 120 formed on the surface of the cathode 110a is inserted or dipped into the pre-support member 220' in a liquid state. The pre-support member 220' may include a material that may be cured by heat or UV light. For example, the pre-support member 220' may include, but is not limited to, a polymer epoxy.

When the portion of the electrolyte membrane 120 is inserted into the pre-support member 220', the pre-support member 220' is cured by heat or UV light. The pre-support member 220' is cured and thus enters a solid state, such that the cathode 110a surrounded by the electrolyte membrane 120 is supported by the pre-support member 220' in such a way not to fall or collapse.

Figure 29:
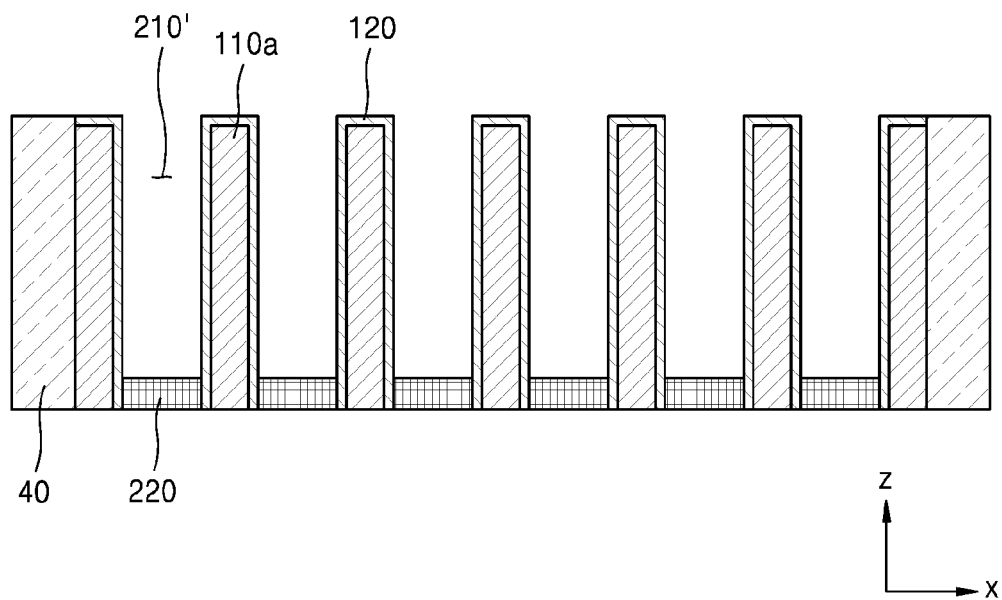

Referring to FIG. 29, to expose a bottom of the cathode 110a, a portion of the pre-support member 220' and a portion of the electrolyte membrane 120 may be removed. For example, the pre-support member 220' and the electrolyte membrane 120 disposed in a lower portion of the cathode 110a may be removed.

The pre-support member 220' and the electrolyte membrane 120 disposed in a lower portion of the cathode 110a may be removed using, for example, a polishing method. To remove the pre-support member 220' and the electrolyte membrane 120, mechanical polishing may be used without being limited thereto. For example, the method of plasma ashing may also be used.

Using polishing, the lower portion of the cathode 110a is exposed and the support member 220 disposed between the electrolyte membranes 120 may be formed. In this case, a lower portion of the support frame 40 may be partially removed, without being limited thereto.

The support member 220 may have a height that is from about 5% to about 15% of a height of the cathode 110a. The support member 220 may have a height that is greater than a thickness of the electrolyte membrane 120.

Figure 30:
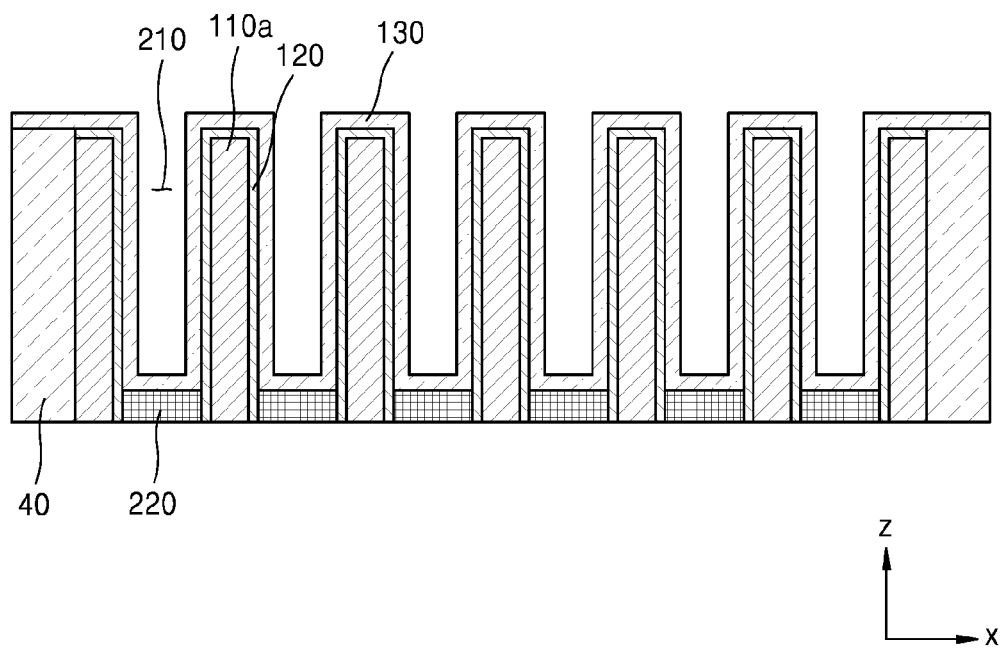

Referring to FIG. 30, the anode 130 is formed on the electrolyte membrane 120. For example, the anode 130 may be formed on the surface of the electrolyte membrane 120 to surround at least a portion of the electrolyte membrane 120. The anode 130 may be formed on the plurality of electrolyte membranes 120 and the support members 220 disposed therebetween along the shapes of the plurality of electrolyte membranes 120 and the support members 220. The anode 130 may be formed on a portion of the left side surface, the upper surface, and on a portion of the right side surface of the electrolyte membrane 120, and on the upper surface of the support member 220. Thus, the plurality of unit cells 10, each including the cathode 110a, the electrolyte membrane 120, and the anode 130, may be spaced apart from each other in the left to right direction. The anodes 130 in the adjacent unit cells 10 are connected to each other, and the support member 220 is disposed below the anode 130.

The cavity 210 exists between adjacent units of the plurality of unit cells 10. The cavity 210 may be designed to have a left to right width that is from about one time to about five times as large as the thickness of the anode 130. The cavity 210 may be designed to have a left to right width that is from about one time to about five times as large as a left to right width of the cathode 110a.

Figure 31:
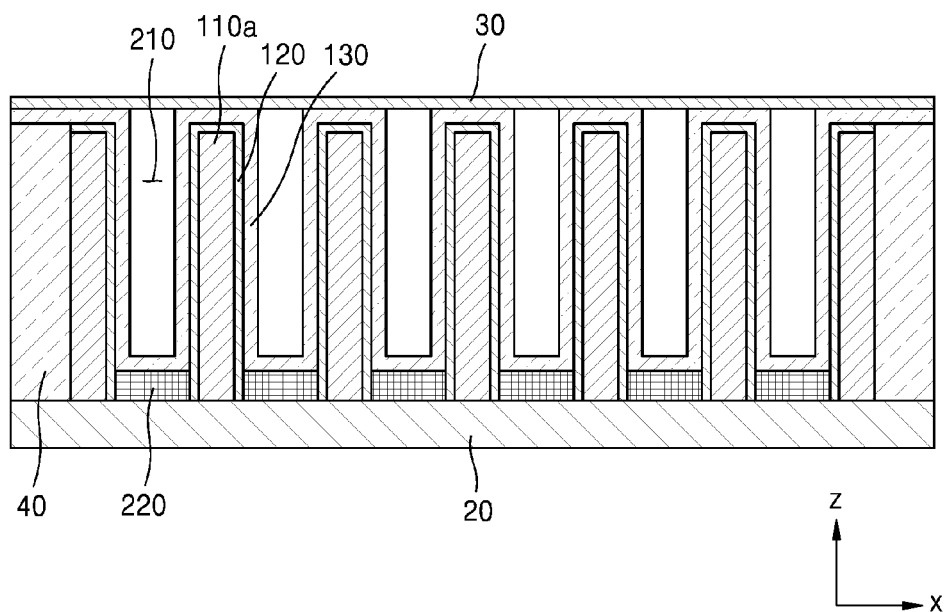

Referring to FIG. 31, the anode current collector 30 is formed on the anode 130 and the cathode current collector 20 is formed below the cathode 110a. The anode current collector 30 is electrically connected to the anode 130, and the cathode current collector 20 is electrically connected to the cathode 110a. The anode current collector 30 and the cathode current collector 20 may be disposed in parallel with each other. The cathode current collector 20 and the cathode 110a may be electrically connected using a conductive adhesive. The conductive adhesive may include, but is not limited to, a conductive epoxy, a metallic paste, or a combination thereof.

The anode current collector 30 and the cathode current collector 20 may include a conductive metallic material such as Cu, Au, Pt, Ag, Zn, Al, Mg, Ti, Fe, Co, Ni, Ge, In, Pd, or the like, or a combination thereof.

The cathode current collector 20 electrically contacts the inner current collector 21 disposed inside the cathode 110a. The plurality of cathodes 110a may be disposed vertically on the cathode current collector 20. The plurality of inner current collector 21 may be disposed vertically on the cathode current collector 20.

Figure 32:
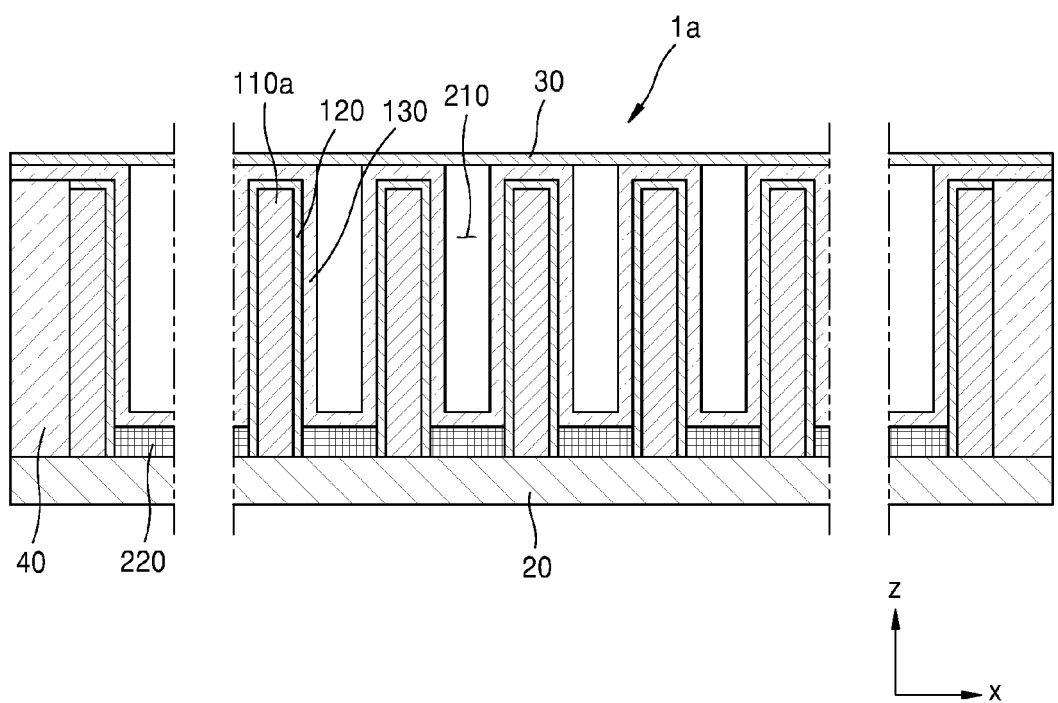

Referring to FIG. 32, opposite end portions where the support frame 40 is formed are removed from the structure of FIG. 31. In this way, the secondary battery 1a of FIG. 6 is completed. However, the support frame 40 may or may not be removed from the secondary battery 1a, and the secondary battery 1a may be used without removal of the support frame 40, as shown in FIG. 31.

Figure 33:
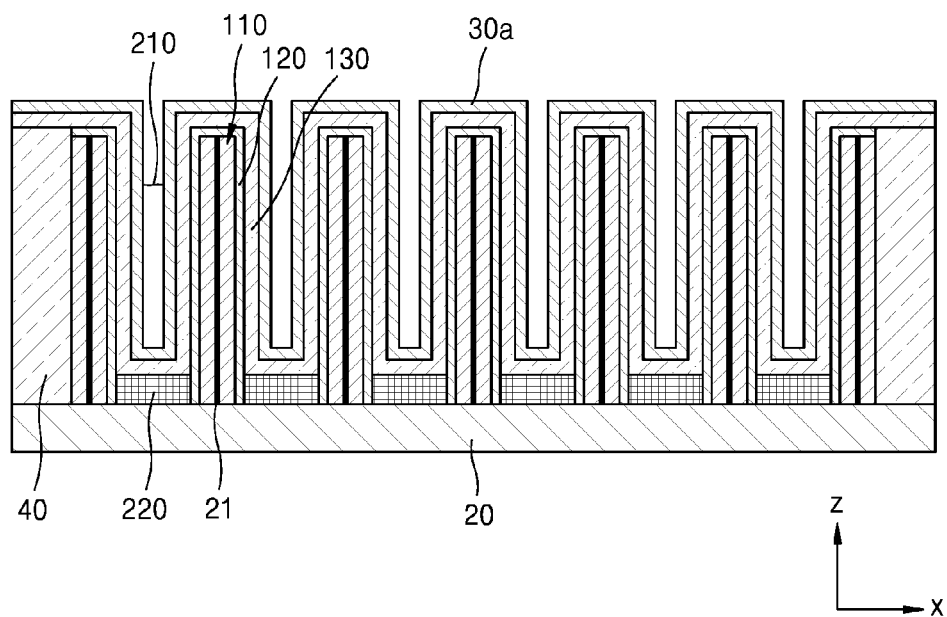
FIGS. 33 and 34 are views describing a method of manufacturing the secondary battery shown in FIG. 7.
Figure 34:
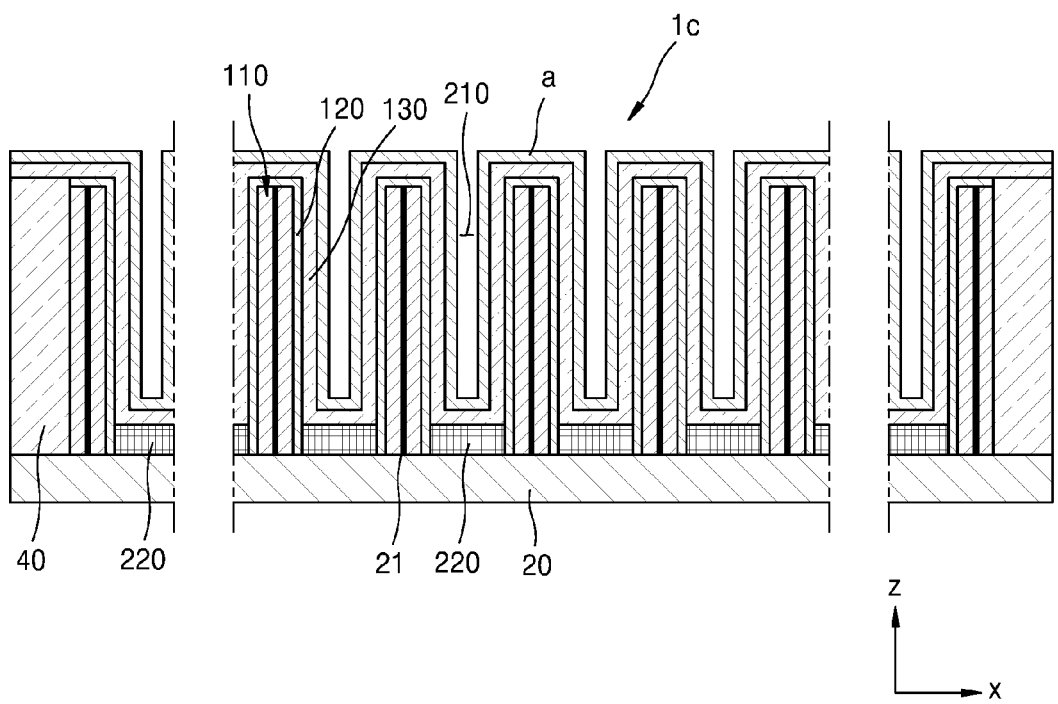

FIGS. 33 and 34 are views describing a method of manufacturing the secondary battery 1b shown in FIG. 7. In the secondary battery 1b shown in FIG. 7, the anode 130 may be formed according to the process shown in FIGS. 10 through 19. A subsequent manufacturing process which occurs after formation of the anode 130 will be described with reference to FIGS. 33 and 34.

Referring to FIG. 33, the cathode current collector 20 is formed below the cathode 110. The cathode current collector 20 is electrically connected to the cathode 110.

The anode current collector 30a is formed on the anode 130. The anode current collector 30a is formed along the surface of the anode 130. The anode current collector 30a is electrically connected to the anode 130. The anode current collector 30a electrically contacts not only the top surface of the anode 130, but also the surface of the anode 130 facing the cavity 210.

The anode current collector 30a and the cathode current collector 20 may include a conductive metallic material such as Cu, Au, Pt, Ag, Zn, Al, Mg, Ti, Fe, Co, Ni, Ge, In, Pd, or the like, or a combination thereof.

The cathode current collector 20 electrically contacts the inner current collector 21 disposed inside the cathode 110. The plurality of cathodes 110 may be disposed vertically on the cathode current collector 20. The plurality of inner current collectors 21 may be disposed vertically on the cathode current collector 20.

Referring to FIG. 34, opposite end portions where the support frame 40 is formed are removed from the structure of FIG. 33. In this way, the secondary battery 1b of FIG. 7 is completed. However, the support frame 40 may or may not be removed from the secondary battery 1b, and the secondary battery 1b may be used without removal of the support frame 40, as shown in FIG. 33.

With the secondary batteries and the method of manufacturing the same according to the embodiments described above, cavities are formed between unit cells of the plurality of unit cells, and the support members supporting the plurality of unit cells in the left to right direction are disposed in the cavities, thereby improving the stability of the secondary battery.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A secondary battery comprising:
a plurality of unit cells, wherein each unit cell of the plurality of unit cells comprises
a cathode extending in a top to bottom direction,
an electrolyte membrane surrounding at least three surfaces of the cathode, and
an anode surrounding at least a portion of the electrolyte membrane,
wherein unit cells of the plurality of unit cells are spaced apart from each other in a left to right direction, with empty cavities therebetween, and
a support member configured to support the plurality of unit cells in the left to right direction and disposed between unit cells of the plurality of unit cells.

2. The secondary battery of claim 1, wherein a width of each of the cavities in the left to right direction is from about one time to about five times greater than a width of the cathode in the left to right direction.

3. The secondary battery of claim 1, wherein a width of each of the cavities in the left to right direction is from about one time to about five times greater than a thickness of the anode.

4. The secondary battery of claim 1, wherein a height of the support member is from about 5% to about 15% of a height of the cathode.

5. The secondary battery of claim 1, wherein a height of the support member is greater than a thickness of the electrolyte membrane.

6. The secondary battery of claim 1, wherein the support member is elastically deformable.

7. The secondary battery of claim 6, wherein the support member has a Young's modulus from about 0.1 gigapascal to about 10 gigpascals.

8. The secondary battery of claim 1, wherein the support member is ionically conductive.

9. The secondary battery of claim 1, wherein the support member is disposed between electrolyte membranes of adjacent unit cells.

10. The secondary battery of claim 9, wherein the support member is disposed below the anode.

11. The secondary battery of claim 1, wherein a volume of the anode during charging of the secondary battery is from about 150% to about 400% of a volume of the anode during discharging of the secondary battery.

12. The secondary battery of claim 1, wherein a volume of the cathode during charging of the secondary battery is from about 110% to about 130% of a volume of the cathode during discharging of the secondary battery.

13. The secondary battery of claim 1, further comprising:
a cathode current collector in electrical contact with an end portion of the cathode of each unit cell of the plurality of unit cells.

14. The secondary battery of claim 13, further comprising:
an inner current collector disposed in the cathode of each unit cell of the plurality of unit cells, and electrically connected to the cathode current collector.

15. The secondary battery of claim 1, further comprising:
an anode current collector in electrical contact with the anode.

16. The secondary battery of claim 15, wherein the anode current collector is in electrical contact with a surface of the anode facing the cavity.

17. The secondary battery of claim 1, wherein the cathode of each unit cell of the plurality of unit cells further extends in a front to rear direction.

18. A method of manufacturing a secondary battery, the method comprising:
removing a plurality of sacrificial layers from a stacked structure, the stacked structure comprising a plurality of cathodes and the plurality of sacrificial layers alternately stacked in a left to right direction to space each cathode of the plurality of cathodes apart from each other in the left to right direction;
forming an electrolyte membrane on surfaces of each cathode of the plurality of cathodes spaced apart from each other;
forming a support member supporting the electrolyte membrane in the left to right direction, the support member being formed between the electrolyte membranes formed on surfaces of the plurality of cathodes spaced apart from each other; and
forming an anode on surfaces of the electrolyte membranes,
wherein the forming of the anode comprises forming the anode such that an empty cavity is formed between the anodes formed on facing surfaces of the electrolyte membranes.

19. The method of claim 18, wherein the forming of the anodes comprises forming the anodes such that a width of each of the cavities in the left to right direction is from about one time to about five times greater than a width of each of the cathodes in the left to right direction.

20. The method of claim 18, wherein the forming of the anodes comprises forming the anodes such that a width of each of the cavities in the left to right direction is from about one time to about five times greater than a thickness of the anode.

21. The method of claim 18, wherein the forming of the support member comprises forming the support member such that a height of the support member is from about 5% to about 15% of a height of each of the cathode.

22. The method of claim 18, wherein the support member is elastically deformable.

23. The method of claim 22, wherein the support member has a Young's modulus from about 0.1 gigapascal to about 10 gigapascals.

24. The method of claim 18, wherein the support member is ionically conductive.

25. The method of claim 18, further comprising:
forming a cathode current collector in electrical contact with the plurality of cathodes; and
forming an anode current collector in electrical contact with the anode.

26. The method of claim 25, wherein the forming of the anode current collector comprises forming the anode current collector on a surface of each cathode of the plurality of cathodes.

27. The method of claim 18, wherein the forming of the support member comprises:
inserting a portion of the electrolyte membrane into a pre-support member; and
removing a portion of the pre-support member and a portion of the portion of the electrolyte membrane to expose the cathode to an outside of the secondary battery.

* * * * *